(12) United States Patent
Samudrala et al.

(10) Patent No.: US 12,404,877 B2
(45) Date of Patent: Sep. 2, 2025

(54) PRESSURE EXCHANGERS WITH FOULING AND PARTICLE HANDLING CAPABILITIES

(71) Applicant: Energy Recovery, Inc., San Leandro, CA (US)

(72) Inventors: Omprakash Samudrala, San Ramon, CA (US); Raja Faruq Raja Baharuddin, Castro Valley, CA (US); Alexander Patrick Theodossiou, Alameda, CA (US); Dung Le Tran, Castro Valley, CA (US); Sujan Reddy Gudigopuram, San Ramon, CA (US)

(73) Assignee: Energy Recovery, Inc., San Leandro, CA (US)

(*) Notice: Subject to any disclaimer, the term of this patent is extended or adjusted under 35 U.S.C. 154(b) by 0 days.

(21) Appl. No.: 18/849,446

(22) PCT Filed: Mar. 24, 2023

(86) PCT No.: PCT/US2023/016296
§ 371 (c)(1),
(2) Date: Sep. 20, 2024

(87) PCT Pub. No.: WO2023/183612
PCT Pub. Date: Sep. 28, 2023

(65) Prior Publication Data
US 2025/0188957 A1 Jun. 12, 2025

Related U.S. Application Data

(60) Provisional application No. 63/323,462, filed on Mar. 24, 2022.

(51) Int. Cl.
F04F 13/00 (2009.01)
F04B 53/04 (2006.01)
(Continued)

(52) U.S. Cl.
CPC .............. *F04F 13/00* (2013.01); *F04B 53/04* (2013.01); *F04B 53/06* (2013.01); *F04B 53/18* (2013.01);
(Continued)

(58) Field of Classification Search
CPC .......... F04B 53/04; F04B 53/06; F04B 53/18; F04F 13/00; F16N 31/00; F16N 2033/005
See application file for complete search history.

(56) References Cited

U.S. PATENT DOCUMENTS

| 2,800,120 A | 7/1957 | Jendrassik et al. | |
| 2015/0184502 A1* | 7/2015 | Krish | F04F 13/00 166/177.5 |

(Continued)

FOREIGN PATENT DOCUMENTS

| EP | 3090187 A2 | 11/2016 |
| EP | 3635260 A1 | 4/2020 |

OTHER PUBLICATIONS

International Search Report and Written Opinion for International Application No. PCT/US23/16296, dated Jul. 13, 2023, 16 pages.

*Primary Examiner* — Charles G Freay
(74) *Attorney, Agent, or Firm* — Lowenstein Sandler LLP

(57) ABSTRACT

A system includes a pressure exchanger and one or more valves. The pressure exchanger includes a rotor that is configured to exchange pressure between a first fluid and a second fluid. The pressure exchanger further includes a housing disposed around the rotor, one or more flushing inlets coupled to the housing, and one or more flushing outlets coupled to the housing. The one or more first valves are coupled to the one or more flushing outlets. The one or more first valves in an open position are associated with a flushing operation. The one or more first valves in a closed position are associated with a lubrication operation.

20 Claims, 16 Drawing Sheets

(51) Int. Cl.
  *F04B 53/06*   (2006.01)
  *F04B 53/18*   (2006.01)
  *F16N 31/00*   (2006.01)
  *F16N 33/00*   (2006.01)

(52) U.S. Cl.
  CPC ........ *F16N 31/00* (2013.01); *F16N 2033/005* (2013.01)

(56) References Cited

U.S. PATENT DOCUMENTS

| | | | |
|---|---|---|---|
| 2016/0160890 A1* | 6/2016 | Anderson | F15B 15/063 92/61 |
| 2018/0087364 A1 | 3/2018 | Krish et al. | |
| 2018/0347601 A1* | 12/2018 | Hoffman | F04B 53/20 |
| 2023/0008069 A1* | 1/2023 | McLean, Jr. | F04F 13/00 |

* cited by examiner

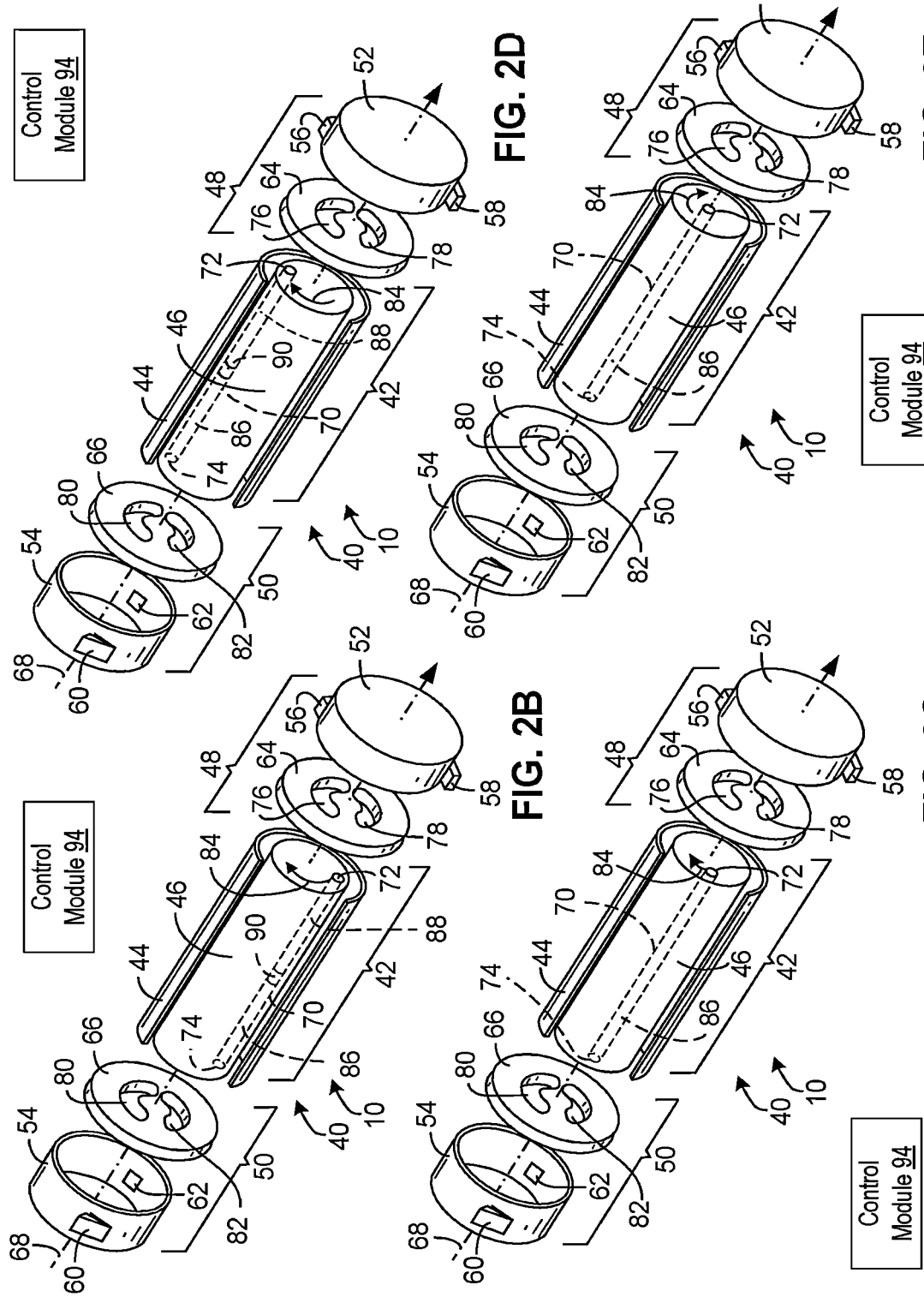

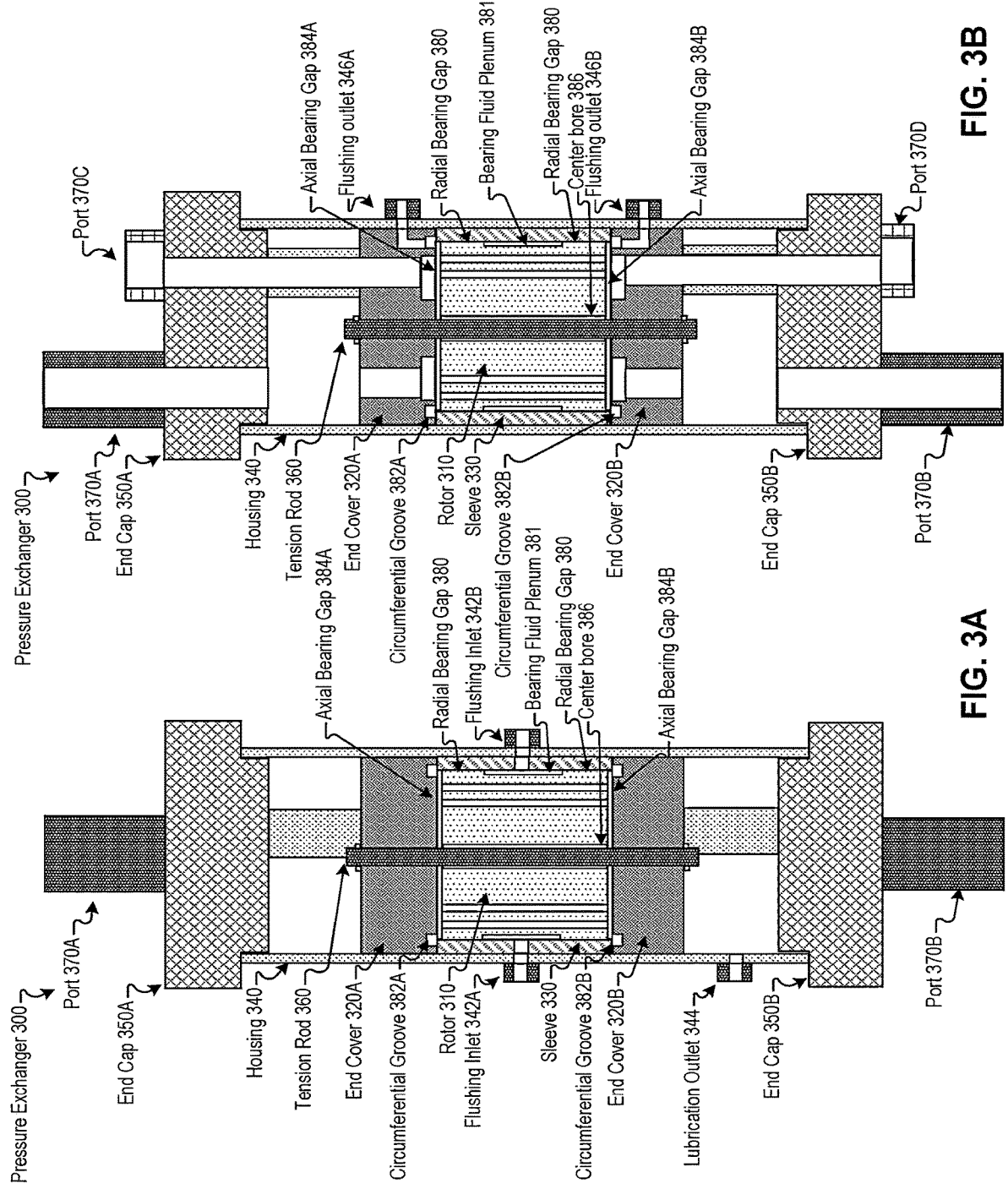

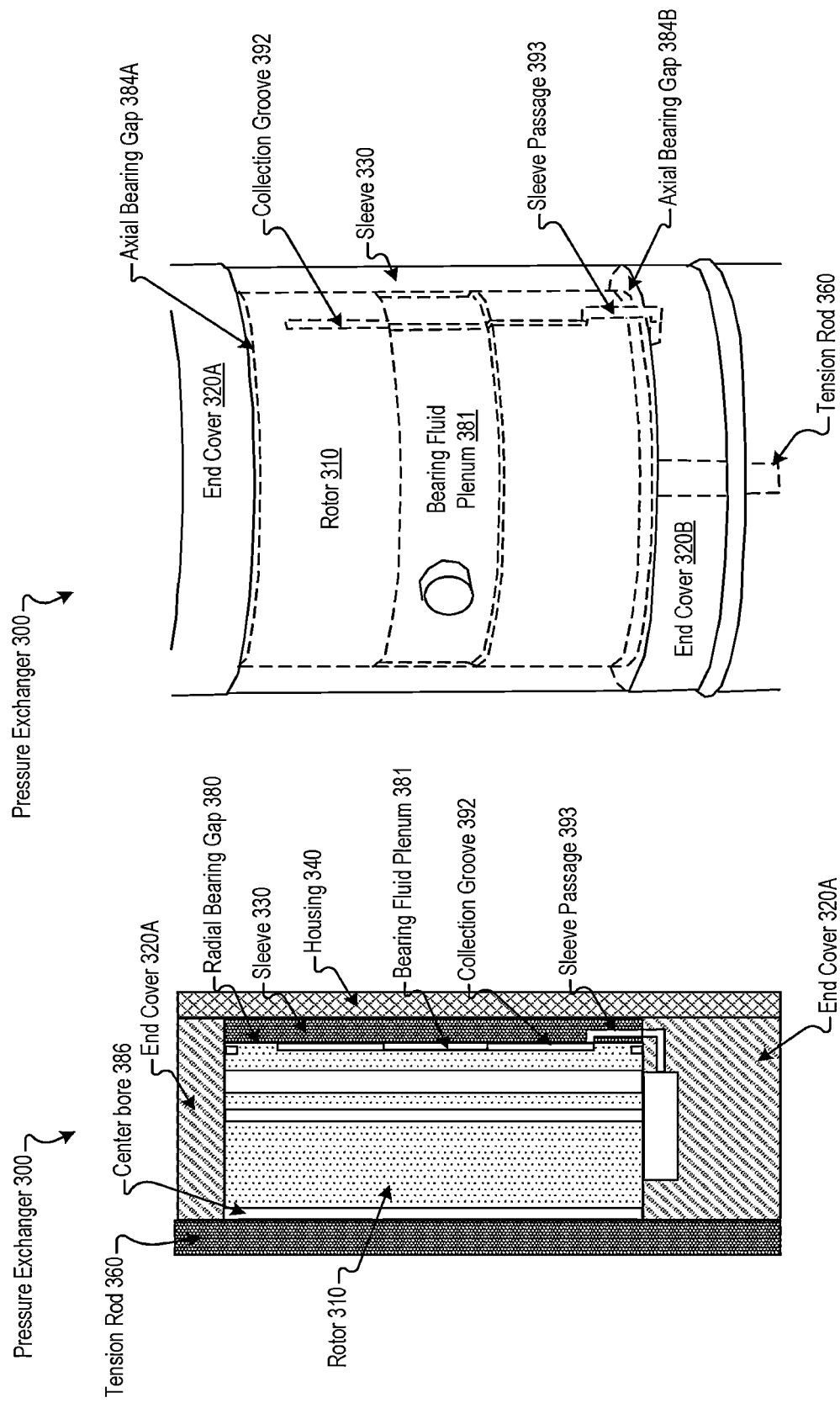

PRESSURE EXCHANGERS WITH FOULING AND PARTICLE HANDLING CAPABILITIES

RELATED APPLICATIONS

This is a national stage application under 35 U.S.C. 371 of International Application PCT/US23/16296, filed Mar. 24, 2023, which claims benefit of U.S. Provisional Application No. 63/323,462, filed Mar. 24, 2022, the contents of which are incorporated by reference in their entirety.

TECHNICAL FIELD

The present disclosure relates to pressure exchangers, and, more particularly, pressure exchangers with fouling and particle handling capabilities.

BACKGROUND

Systems use fluids at different pressures. Systems use components to increase pressure of fluid.

BRIEF DESCRIPTION OF THE DRAWINGS

The present disclosure is illustrated by way of example, and not by way of limitation in the figures of the accompanying drawings.

FIGS. 2A-E are exploded perspective views of pressure exchangers (PXs), according to certain embodiments.

DETAILED DESCRIPTION OF EMBODIMENTS

Figure 1A:
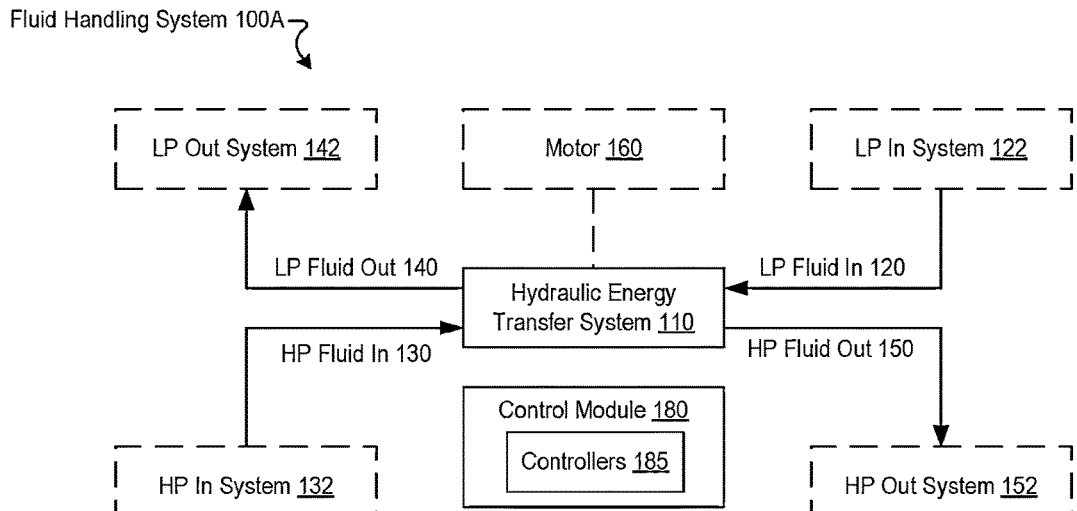
FIGS. 1A-D illustrate schematic diagrams of fluid handling systems including hydraulic energy transfer systems, according to certain embodiments.

Embodiments described herein are related to pressure exchangers with fouling and particle handling capabilities.

Systems may use fluids at different pressures. A supply of a fluid to a system may be at lower pressure and one or more portions of the system may operate at higher pressures. A system may include a closed loop with various fluid pressures maintained in different portions of the loop. These systems may include hydraulic fracturing (e.g., fracking or fracing) systems, desalinization systems, refrigeration systems, heat pump systems, energy generation systems, mud pumping systems, slurry pumping systems, industrial fluid systems, waste fluid systems, fluid transportation systems, etc. Pumps or compressors may be used to increase pressure of fluids of such systems.

Conventionally, systems (e.g., refrigeration systems, heat pump systems, reversible heat pump systems, water systems, or the like) use pumps or compressors to increase the pressure of a fluid (e.g., a refrigeration fluid such as carbon dioxide ($CO_2$), R-744, R-134a, hydrocarbons, hydrofluorocarbons (HFCs), hydrochlorofluorocarbons (HCFCs), ammonia ($NH_3$), refrigerant blends, R-407A, R-404A, etc.). Conventionally, separate pumps or compressors mechanically coupled to motors are used to increase pressure of the fluid in any portion of a system including an increase in fluid pressure. Pumps and compressors, especially those that operate over a large pressure differential (e.g., cause a large pressure increase in the fluid), require large quantities of energy. Conventional systems thus expend large amounts of energy increasing the pressure of the fluid (via the pumps or compressors driven by the motors). Additionally, conventional fluid transfer systems decrease the pressure of the fluid through expansion valves. Conventional systems inefficiently increase pressure of fluid and decrease pressure of the fluid (e.g., when operating in a loop). This is wasteful in terms of energy used to run the conventional systems (e.g., energy used to repeatedly increase the pressure of the refrigeration fluid to cause increase or decrease of temperature of the surrounding environment).

Conventionally, systems (e.g., refrigeration systems, heat pump systems, reversible heat pump systems, water systems, systems used for reverse osmosis (RO) based industrial waste water treatment plants, or the like) have devices that stall frequently due to fouling (e.g., scaling, organic growth) and particles becoming embedded in gaps. The devices are then disassembled, cleaned, and reassembled which causes downtime and loss of production. Also, disassembly and reassembly can cause potential damage to components, causing performance degradation or even loss of function. Pre-treatment of fluids (e.g., industrial waste water) to attempt to mitigate fouling and stalling is a challenge as fluids (e.g., water chemistry and composition) can vary (e.g., from plant to plant and from industry to industry). Even if a pre-treatment process is used, there can still be stalling, component damage, downtime, loss of production, etc. to varying in composition of fluids.

The systems, devices, and methods of the present disclosure provide solutions to these and other shortcomings of conventional systems. The present disclosure provides PXs for use in systems (e.g., fluid handling systems, heat transfer systems, refrigeration systems, heat pump systems, cooling systems, heating systems, etc.). In a system, a PX may be configured to exchange pressure between a first fluid (e.g., a high pressure fluid) and a second fluid (e.g., a low pressure fluid). The PX may receive the first fluid via a first inlet (e.g., a high pressure inlet) and a second fluid via a second inlet (e.g., a low pressure inlet). When entering the PX, the first fluid may be of a higher pressure than the second fluid. The PX may exchange pressure between the first fluid and the second fluid. The first fluid may exit the PX via a first outlet (e.g., a low pressure outlet) and the second fluid may exit the PX via a second outlet (e.g., a high pressure outlet). When exiting the PX, the second fluid may have a higher pressure than the first fluid (e.g., pressure has been exchanged between the first fluid and the second fluid).

In some embodiments, a system includes PX includes a rotor configured to exchange pressure between a first fluid and a second fluid. The PX may further include a housing disposed around the rotor, one or more flushing inlets coupled to the housing, and one or more flushing outlets coupled to the housing. One or more first valves may be coupled (e.g., fluidly coupled) to the one or more flushing outlets. The one or more first valves in an open position are associated with a flushing operation (e.g., flushing fluid enters radial bearing gaps via the flushing inlets and exits the circumferential groove via the flushing outlets). The flushing operation may occur when the PX is not exchanging pressure between fluids. The flushing operation may clear particles from the radial bearing gaps and the circumferential grooves. The one or more first valves in a closed position are associated with a lubrication operation (e.g., lubrication fluid enters the radial bearing gaps and exits with the first fluid or the second fluid exiting the PX).

Systems, devices, and methods of the present disclosure provide advantages over conventional solutions. Systems of the present disclosure reduce energy consumption compared to conventional systems. For example, use of a PX of the present disclosure may recover energy stored as pressure and transfer that energy back into the system, reducing the energy cost of operating the system. Systems of the present disclosure may reduce wear on components (e.g., pumps, compressors) compared to conventional systems. Systems of the present disclosure may stall less, have less fouling, have less particles embedded in gaps, have less disassembly cleaning processes, have less downtime, have less component damage, and have less loss of production compared to conventional systems.

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, systems that do not include pressure exchangers, etc.).

Although some embodiments of the present disclosure are described in relation to exchanging pressure between fluid used in fracing systems, desalinization systems, heat pump systems, and/or refrigeration systems, the present disclosure can be applied to other types of systems. Fluids can refer to liquid, gas, transcritical fluid, supercritical fluid, subcritical fluid, and/or combinations thereof.

FIGS. 1A-D illustrate schematic diagrams of fluid handling systems 100 including hydraulic energy transfer systems 110, according to certain embodiments.

In some embodiments, a hydraulic energy transfer system 110 includes a pressure exchanger (e.g., PX). The PX may include one or more of the features described in one or more of FIGS. 3A-V (e.g., inlets, outlets, and valves to perform flushing and lubrication operations) to provide fouling and particle handling capabilities.

The hydraulic energy transfer system 110 (e.g., PX) receives low pressure (LP) fluid in 120 (e.g., low-pressure inlet stream) from a LP in system 122. The hydraulic energy transfer system 110 also receives high pressure (HP) fluid in 130 (e.g., high-pressure inlet stream) from HP in system 132. The hydraulic energy transfer system 110 (e.g., PX) exchanges pressure between the HP fluid in 130 and the LP fluid in 120 to provide LP fluid out 140 (e.g., low-pressure outlet stream) to LP fluid out system 142 and to provide HP fluid out 150 (e.g., high-pressure outlet stream) to HP fluid out system 152.

In some embodiments, the hydraulic energy transfer system 110 includes a PX to exchange pressure between the HP fluid in 130 and the LP fluid in 120. The PX may be a device that transfers fluid pressure between HP fluid in 130 and LP fluid in 120 at efficiencies in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids. Examples of fluid separators that may be used with the PX include, but are not limited to, pistons, bladders, diaphragms, and the like. In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. Rotary PXs may be designed to operate with internal pistons to isolate fluids and transfer pressure with relatively little mixing of the inlet fluid streams. Reciprocating PXs may include a piston moving back and forth in a cylinder for transferring pressure between the fluid streams. Any PX or multiple PXs may be used in the present disclosure, such as, but not limited to, rotary PXs, reciprocating PXs, or any combination thereof. In addition, the PX may be disposed on a skid separate from the other components of a fluid handling system 100 (e.g., in situations in which the PX is added to an existing fluid handling system).

In some embodiments, a motor 160 is coupled to hydraulic energy transfer system 110 (e.g., to a PX). In some embodiments, the motor 160 controls the speed of a rotor of the hydraulic energy transfer system 110 (e.g., to increase pressure of HP fluid out 150, to decrease pressure of LP fluid out 140, etc.). In some embodiments, motor 160 generates energy (e.g., acts as a generator) based on pressure exchanging in hydraulic energy transfer system 110.

The hydraulic energy transfer system 110 may be a hydraulic protection system (e.g., hydraulic buffer system, hydraulic isolation system) that may block or limit contact between solid particle laden fluid (e.g., frac fluid) and various equipment (e.g., hydraulic fracturing equipment, high-pressure pumps) while exchanging work and/or pressure with another fluid. By blocking or limiting contact between various equipment (e.g., fracturing equipment) and solid particle containing fluid, the hydraulic energy transfer system 110 increases the life and performance, while reducing abrasion and wear, of various equipment (e.g., fracturing equipment, high pressure fluid pumps). Less expensive equipment may be used in the fluid handling system 100 by using equipment (e.g., high pressure fluid pumps) not designed for abrasive fluids (e.g., frac fluids and/or corrosive fluids).

The hydraulic energy transfer system 110 may include a hydraulic turbocharger or hydraulic pressure exchange system, such as a rotating PX. The PX may include one or more chambers (e.g., 1 to 100) to facilitate pressure transfer and equalization of pressures between volumes of first and second fluids (e.g., gas, liquid, multi-phase fluid). In some embodiments, the PX may transfer pressure between a first fluid (e.g., pressure exchange fluid, such as a proppant free or substantially proppant free fluid) and a second fluid that may be highly viscous and/or contain solid particles (e.g., frac fluid containing sand, proppant, powders, debris, ceramics). The solid particle fluid causes abrasion and/or erosion of components of the PX, such as the rotor and end covers of the PX. The fluid (e.g., abrasive particles in the fluid) may cause wear to an interface between the rotor and each end cover as the rotor rotates relative to the end covers. Replacing worn components of the PX may be costly.

The hydraulic energy transfer system 110 may be used in different types of systems, such as fracing systems, desalination systems, refrigeration systems, etc.

FIG. 1A illustrates a schematic diagram of a fluid handling system 100A including a hydraulic energy transfer system 110, according to certain embodiments. Fluid handling system 100A may include a control module 180 that includes one or more controllers 185.

Figure 1B:
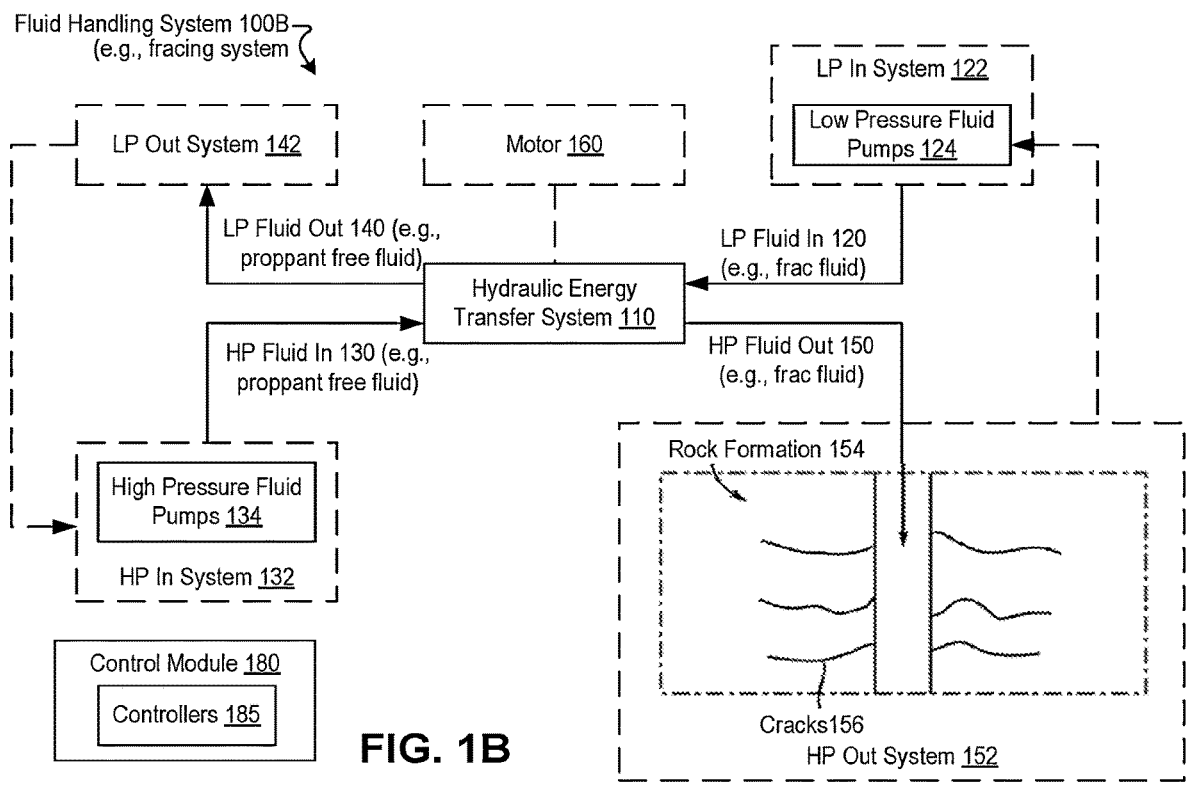

FIG. 1B illustrates a schematic diagram of a fluid handling system 100B including a hydraulic energy transfer system 110, according to certain embodiments. Fluid handling system 100B may be a fracing system. In some embodiments, fluid handling system 100B includes more components, less components, same routing, different routing, and/or the like than that shown in FIG. 1B.

LP fluid in 120 and HP fluid out 150 may be frac fluid (e.g., fluid including solid particles, proppant fluid, etc.). HP fluid in 130 and LP fluid out 140 may be substantially solid particle free fluid (e.g., proppant free fluid, water, filtered fluid, etc.).

LP in system 122 may include one or more low pressure fluid pumps to provide LP fluid in 120 to the hydraulic energy transfer system 110 (e.g., PX). HP in system 132 may include one or more high pressure fluid pumps 134 to provide HP fluid in 130 to hydraulic energy transfer system 110.

Hydraulic energy transfer system 110 exchanges pressure between LP fluid in 120 (e.g., low pressure frac fluid) and HP fluid in 130 (e.g., high pressure water) to provide HP fluid out 150 (e.g., high pressure frac fluid) to HP out system 152 and to provide LP fluid out 140 (e.g., low pressure water). HP out system 152 may include a rock formation 154 (e.g., well) that includes cracks 156. The solid particles (e.g., proppants) from HP fluid out 150 may be provided into the cracks 156 of the rock formation.

In some embodiments, LP fluid out 140, high pressure fluid pumps 134, and HP fluid in 130 are part of a first loop (e.g., proppant free fluid loop). The LP fluid out 140 may be provided to the high pressure fluid pumps to generate HP fluid in 130 that becomes LP fluid out 140 upon exiting the hydraulic energy transfer system 110.

In some embodiments, LP fluid in 120, HP fluid out 150, and low pressure fluid pumps 124 are part of a second loop (e.g., proppant containing fluid loop). The HP fluid out 150 may be provided into the rock formation 154 and then pumped from the rock formation 154 by the low pressure fluid pumps 124 to generate LP fluid in 120.

In some embodiments, fluid handling system 100B is used in well completion operations in the oil and gas industry to perform hydraulic fracturing (e.g., fracking, fracing) to increase the release of oil and gas in rock formations 154. HP out system 152 may include rock formations 154 (e.g., a well). Hydraulic fracturing may include pumping HP fluid out 150 containing a combination of water, chemicals, and solid particles (e.g., sand, ceramics, proppant) into a well (e.g., rock formation 154) at high pressures. LP fluid in 120 and HP fluid out 150 may include a particulate laden fluid that increases the release of oil and gas in rock formations 154 by propagating and increasing the size of cracks 156 in the rock formations 154. The high pressures of HP fluid out 150 initiates and increases size of cracks 156 and propagation through the rock formation 154 to release more oil and gas, while the solid particles (e.g., powders, debris, etc.) enter the cracks 156 to keep the cracks 156 open (e.g., prevent the cracks 156 from closing once HP fluid out 150 is depressurized).

In order to pump this particulate laden fluid into the rock formation 154 (e.g., a well), the fluid handling system 100B may include one or more high pressure fluid pumps 134 and one or more low pressure fluid pumps 124 coupled to the hydraulic energy transfer system 110. For example, the hydraulic energy transfer system 110 may be a hydraulic turbocharger or a PX (e.g., a rotary PX). In operation, the hydraulic energy transfer system 110 transfers pressures without any substantial mixing between a first fluid (e.g., HP fluid in 130, proppant free fluid) pumped by the high pressure fluid pumps 134 and a second fluid (e.g., LP fluid in 120, proppant containing fluid, frac fluid) pumped by the low pressure fluid pumps 124. In this manner, the hydraulic energy transfer system 110 blocks or limits wear on the high pressure fluid pumps 134, while enabling the fluid handling system 100B to pump a high-pressure frac fluid (e.g., HP fluid out 150) into the rock formation 154 to release oil and gas. In order to operate in corrosive and abrasive environments, the hydraulic energy transfer system 110 may be made from materials resistant to corrosive and abrasive substances in either the first and second fluids. For example, the hydraulic energy transfer system 110 may be made out of ceramics (e.g., alumina, cermets, such as carbide, oxide, nitride, or boride bard phases) within a metal matrix (e.g., Co, Cr or Ni or any combination thereof) such as tungsten carbide in a matrix of CoCr, Ni, NiCr or Co.

In some embodiments, the hydraulic energy transfer system 110 includes a PX (e.g., rotary PX) and HP fluid in 130 (e.g., the first fluid, high-pressure solid particle free fluid) enters a first side of the PX where the HP fluid in 130 contacts LP fluid in 120 (e.g., the second fluid, low-pressure frac fluid) entering the PX on a second side. The contact between the fluids enables the HP fluid in 130 to increase the pressure of the second fluid (e.g., LP fluid in 120), which drives the second fluid out (e.g., HP fluid out 150) of the PX and down a well (e.g., rock formation 154) for fracturing operations. The first fluid (e.g., LP fluid out 140) similarly exits the PX, but at a low pressure after exchanging pressure with the second fluid. As noted above, the second fluid may be a low-pressure frac fluid that may include abrasive particles, which may wear the interface between the rotor and the respective end covers as the rotor rotates relative to the respective end covers.

Figure 1C:
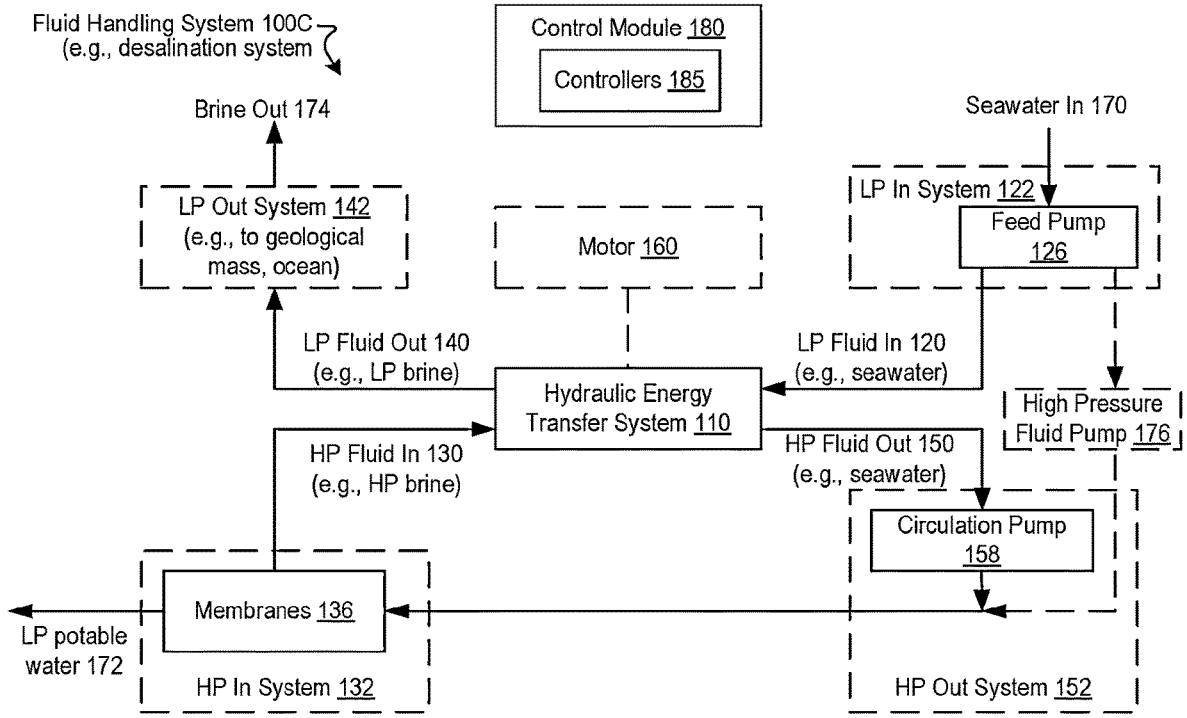

FIG. 1C illustrates a schematic diagram of a fluid handling system 100C including a hydraulic energy transfer system 110, according to certain embodiments. Fluid handling system 100C may be a desalination system (e.g., remove salt and/or other minerals from water). In some embodiments, fluid handling system 100C includes more components, less components, same routing, different routing, and/or the like than that shown in FIG. 1C.

LP in system 122 may include a feed pump 126 (e.g., low pressure fluid pump 124) that receives seawater in 170 (e.g., feed water from a reservoir or directly from the ocean) and provides LP fluid in 120 (e.g., low pressure seawater, feed water) to hydraulic energy transfer system 110 (e.g., PX). HP in system 132 may include membranes 136 that provide HP fluid in 130 (e.g., high pressure brine) to hydraulic energy transfer system 110 (e.g., PX). The hydraulic energy transfer system 110 exchanges pressure between the HP fluid in 130 and LP fluid in 120 to provide HP fluid out 150 (e.g., high pressure seawater) to HP out system 152 and to provide LP fluid out 140 (e.g., low pressure brine) to LP out system 142 (e.g., geological mass, ocean, sea, discarded, etc.).

The membranes 136 may be a membrane separation device configured to separate fluids traversing a membrane, such as a reverse osmosis membrane. Membranes 136 may provide HP fluid in 130 which is a concentrated feed-water or concentrate (e.g., brine) to the hydraulic energy transfer system 110. Pressure of the HP fluid in 130 may be used to compress low-pressure feed water (e.g., LP fluid in 120) to be high pressure feed water (e.g., HP fluid out 150). For simplicity and illustration purposes, the term feed water is used. However, fluids other than water may be used in the hydraulic energy transfer system 110.

The circulation pump 158 (e.g., centrifugal pump) provides the HP fluid out 150 (e.g., high pressure seawater) to membranes 136. The membranes 136 filter the HP fluid out 150 to provide LP potable water 172 and HP fluid in 130 (e.g., high pressure brine). The LP out system 142 provides brine out 174 (e.g., to geological mass, ocean, sea, discarded, etc.).

In some embodiments, a high pressure fluid pump 176 is disposed between the feed pump 126 and the membranes 136. The high pressure fluid pump 176 increases pressure of the low pressure seawater (e.g., LP fluid in 120, provides high pressure feed water) to be mixed with the high pressure seawater provided by circulation pump 158.

In some embodiments, use of the hydraulic energy transfer system 110 decreases the load on high pressure fluid pump 176. In some embodiments, fluid handling system 100C provides LP potable water 172 without use of high pressure fluid pump 176. In some embodiments, fluid handling system 100C provides LP potable water 172 with intermittent use of high pressure fluid pump 176.

In some examples, hydraulic energy transfer system 110 (e.g., PX) receives LP fluid in 120 (e.g., low-pressure feed-water) at about 30 pounds per square inch (PSI) and receives HP fluid in 130 (e.g., high-pressure brine or concentrate) at about 980 PSI. The hydraulic energy transfer system 110 (e.g., PX) transfers pressure from the high-pressure concentrate (e.g., HP fluid in 130) to the low-pressure feed-water (e.g., LP fluid in 120). The hydraulic energy transfer system 110 (e.g., PX) outputs HP fluid out 150 (e.g., high pressure (compressed) feed-water) at about 965 PSI and LP fluid out 140 (e.g., low-pressure concentrate) at about 15 PSI. Thus, the hydraulic energy transfer system 110 (e.g., PX) may be about 97% efficient since the input volume is about equal to the output volume of the hydraulic energy transfer system 110 (e.g., PX), and 965 PSI is about 97% of 980 PSI.

Figure 1D:
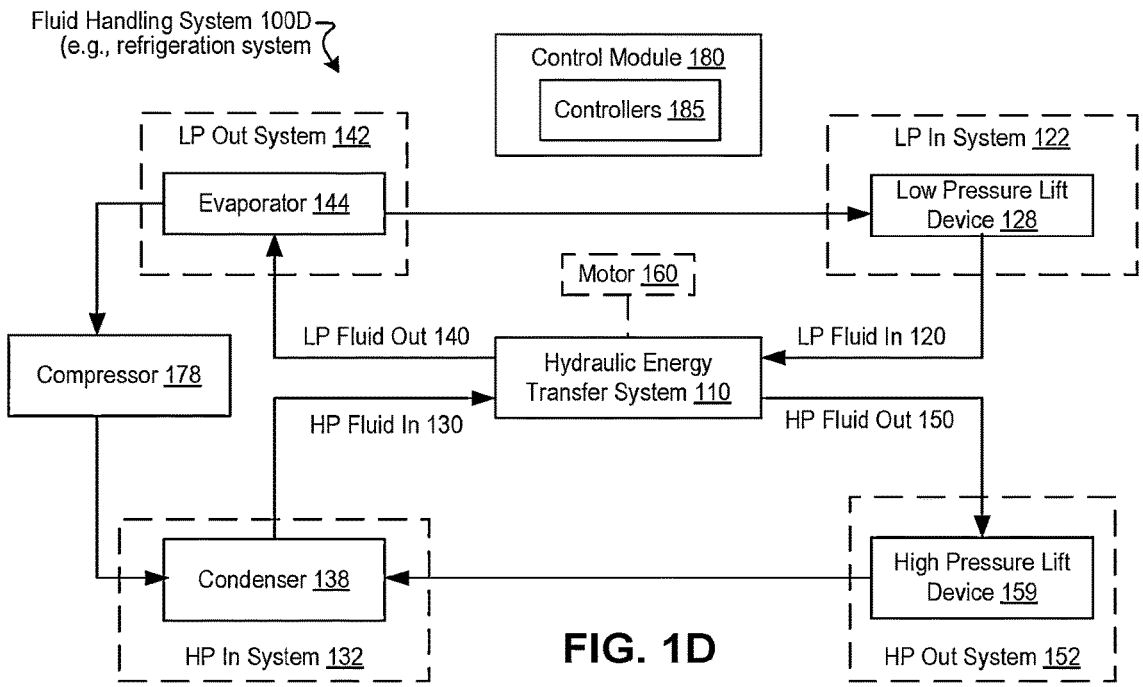
Figure 2A:
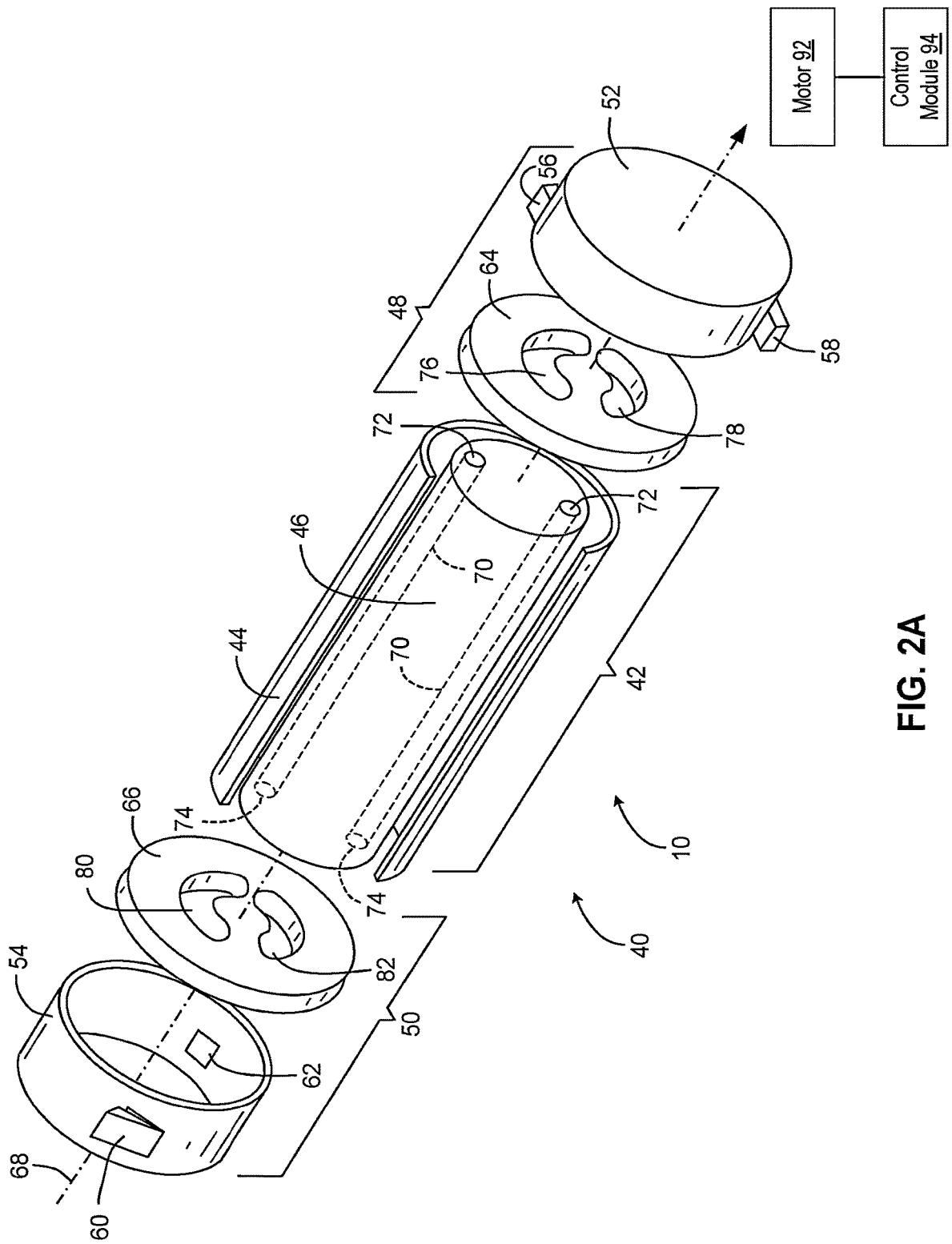

FIG. 1D illustrates a schematic diagram of a fluid handling system 100D including a hydraulic energy transfer system 110, according to certain embodiments. Fluid handling system 100D may be a refrigeration system. In some embodiments, fluid handling system 100D includes more components, less components, same routing, different routing, and/or the like than that shown in FIG. 1D.

Hydraulic energy transfer system 110 (e.g., PX) may receive LP fluid in 120 from LP in system 122 (e.g., low pressure lift device 128, low pressure fluid pump, etc.) and HP fluid in 130 from HP in system 132 (e.g., condenser 138). The hydraulic energy transfer system 110 (e.g., PX) may exchange pressure between the LP fluid in 120 and HP fluid in 130 to provide HP fluid out 150 to HP out system 152 (e.g., high pressure lift device 159) and to provide LP fluid out 140 to LP out system 142 (e.g., evaporator 144). The evaporator 144 may provide the fluid to compressor 178 and low pressure lift device 128. The condenser 138 may receive fluid from compressor 178 and high pressure lift device 159.

The fluid handling system 100D may be a closed system. LP fluid in 120, HP fluid in 130, LP fluid out 140, and HP fluid out 150 may all be a fluid (e.g., refrigerant) that is circulated in the closed system of fluid handling system 100D.

In some embodiments, the fluid of fluid handling system 100D may include solid particles. For example, the piping, equipment, connections (e.g., pipe welds, pipe soldering), etc. may introduce solid particles (e.g., solid particles from the welds) into the fluid in the fluid handling system 100D. The solid particles in the fluid and/or the high pressure of the fluid may cause abrasion and/or erosion of components (e.g., rotor, end covers) of the PX of hydraulic energy transfer system 110.

FIGS. 2A-E are exploded perspective views a rotary PX 40 (e.g., rotary pressure exchanger, rotary liquid piston compressor (LPC)), according to certain embodiments. PX 40 may include a motor 92 and/or a control module 94.

Figure 3C:
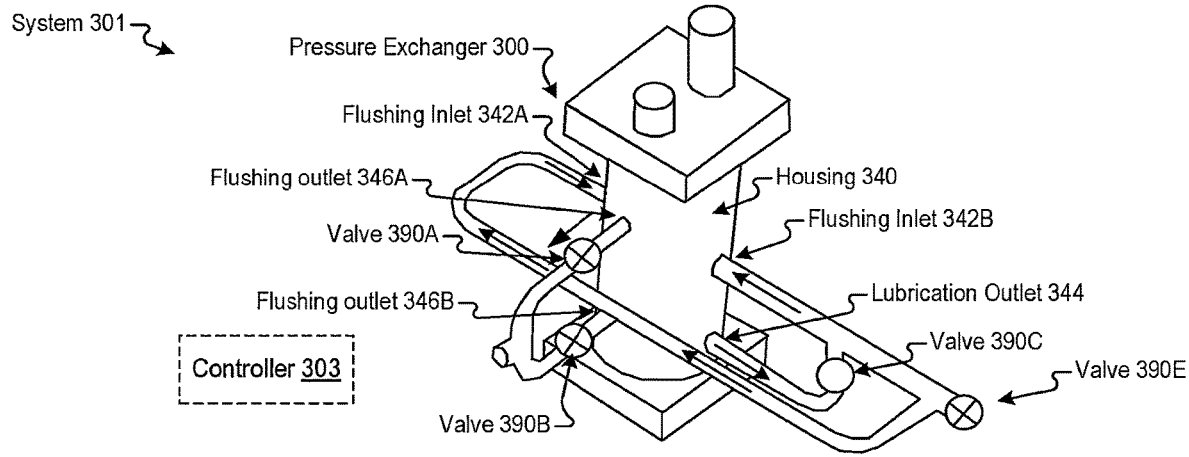
FIGS. 3A-V illustrate PXs, according to certain embodiments.
Figure 3D:
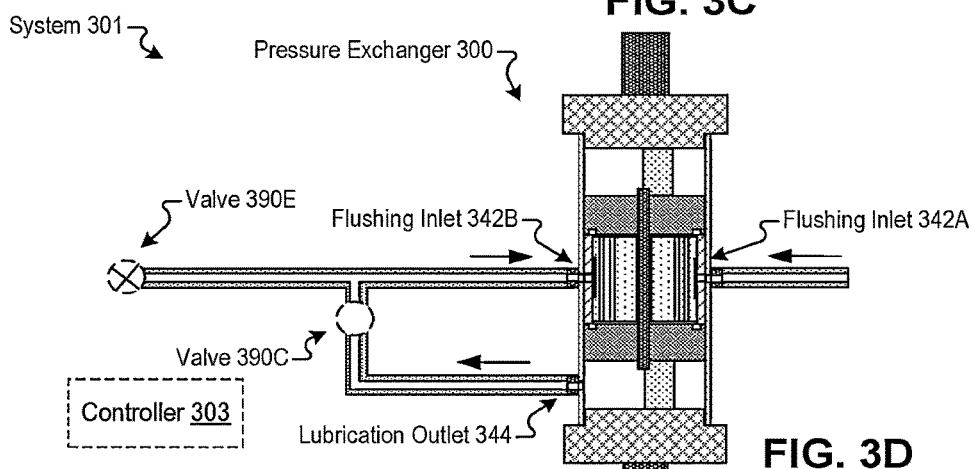
Figure 3E:
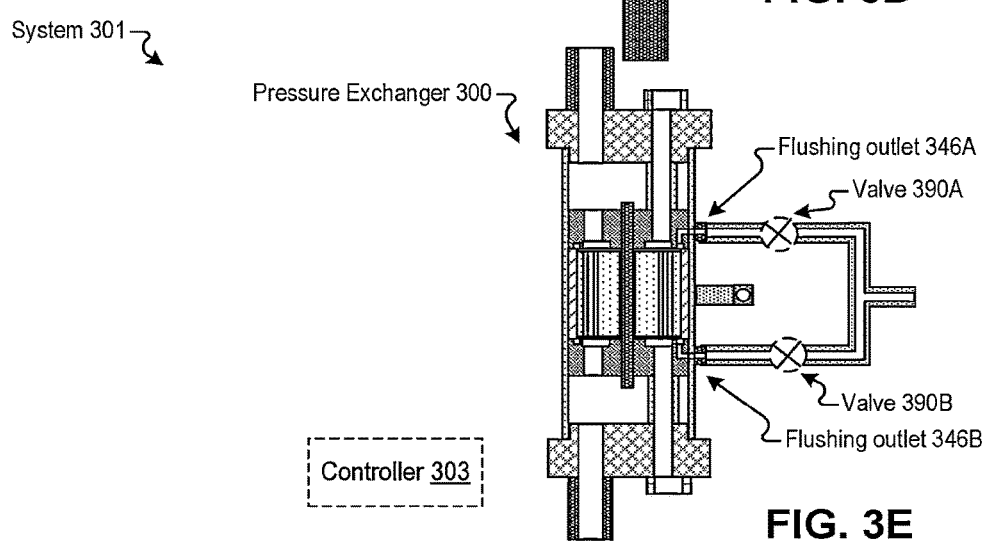
Figure 3F:
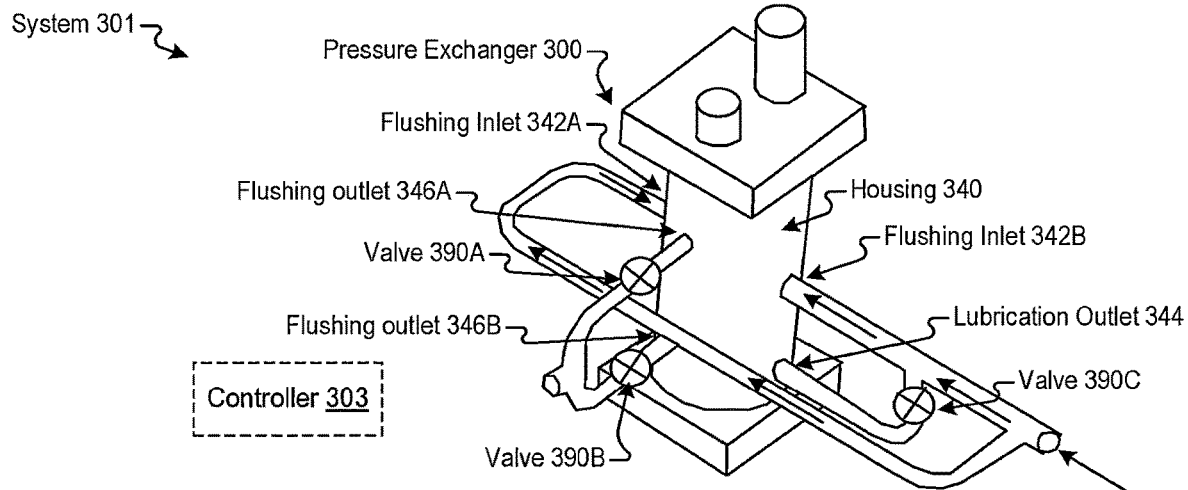
Figure 3G:
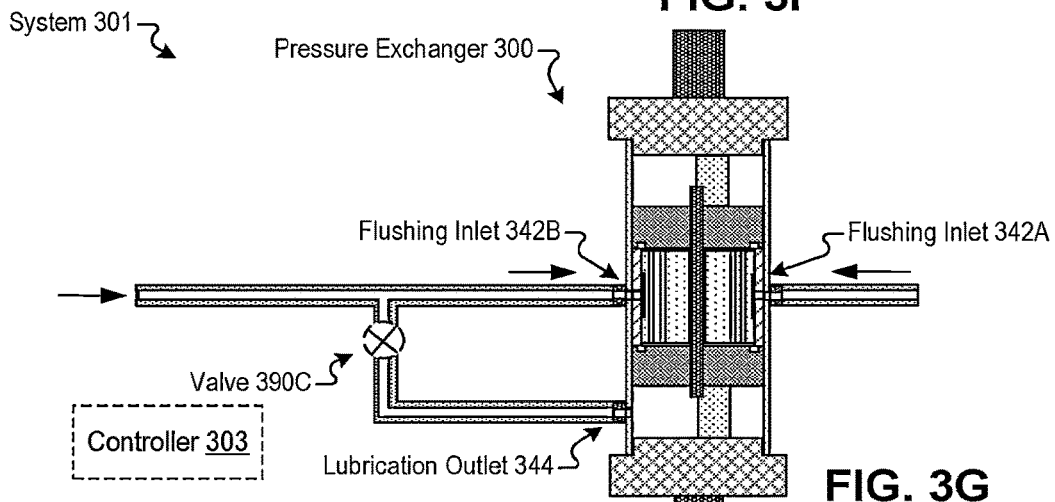
Figure 3H:
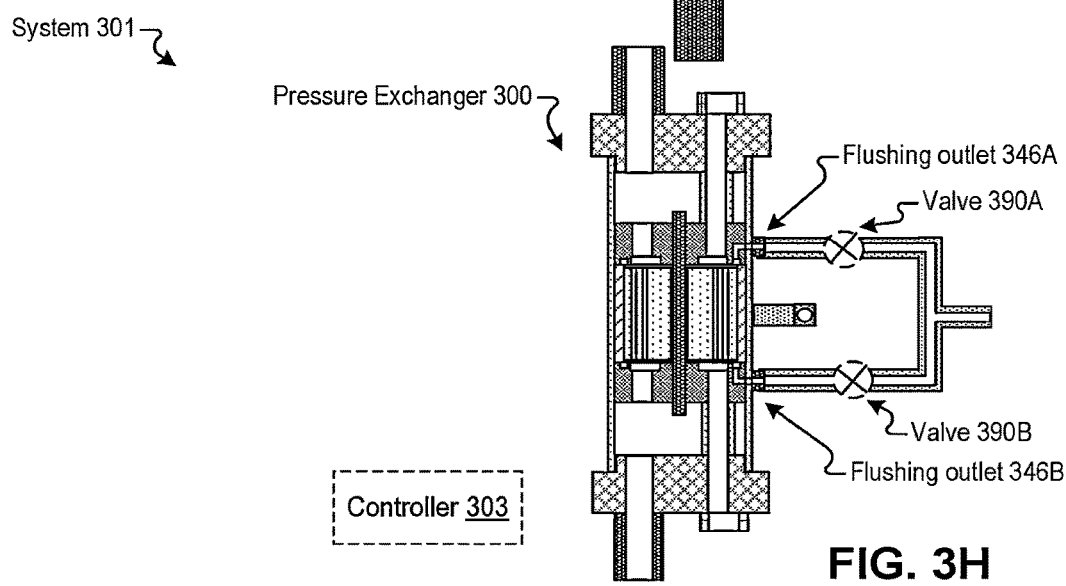
Figure 3I:
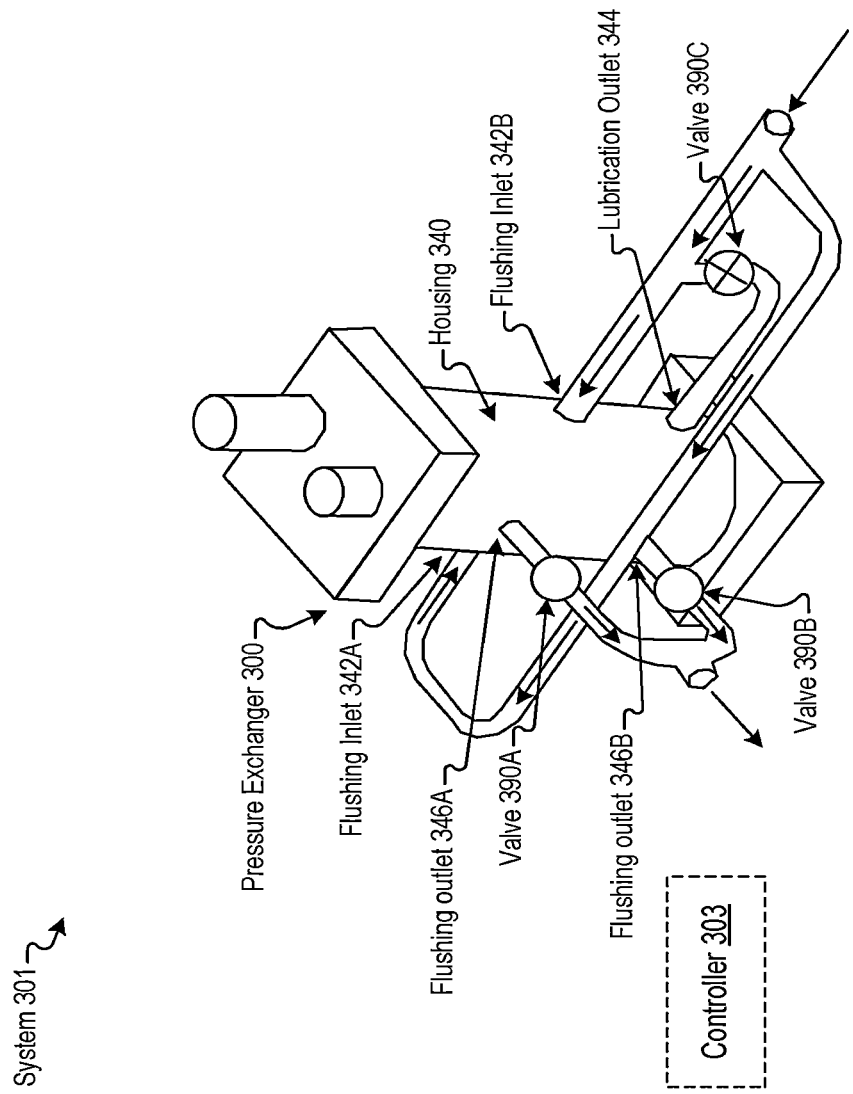
Figure 3J:
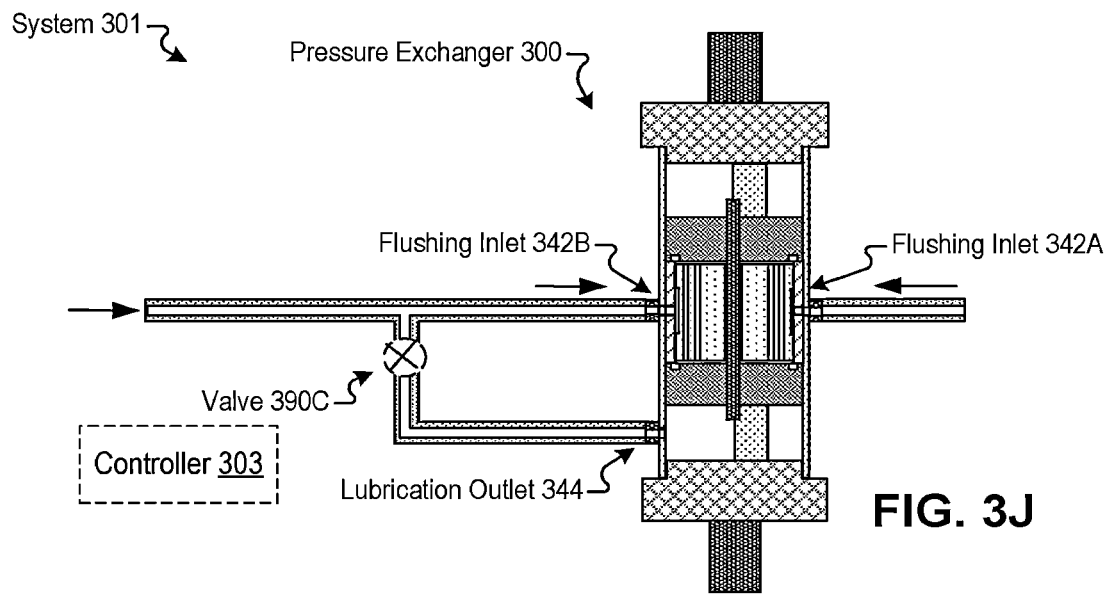
Figure 3K:
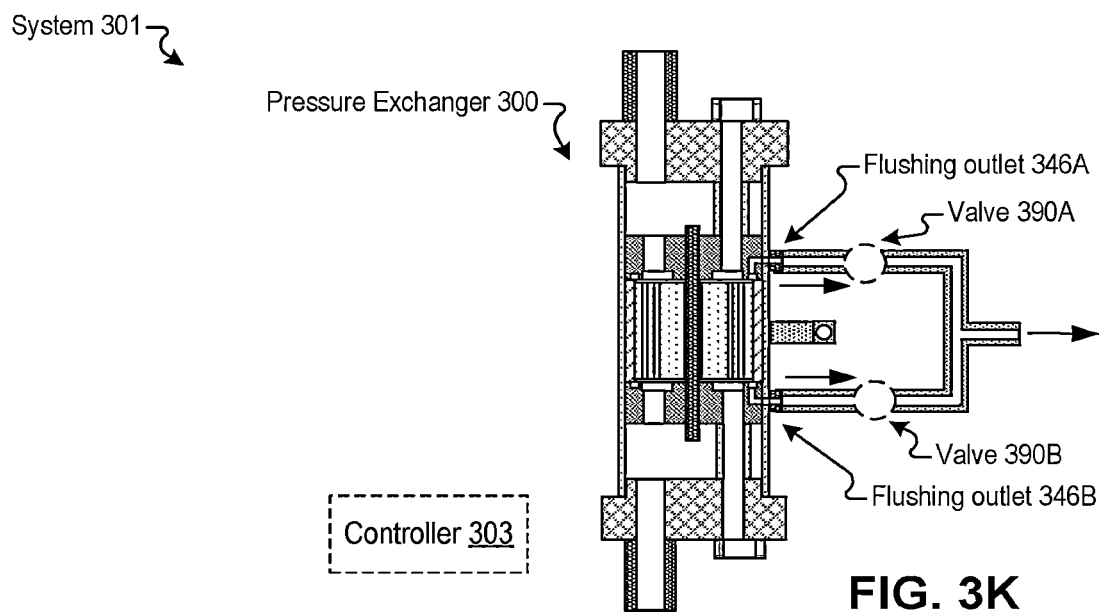
Figure 3L:
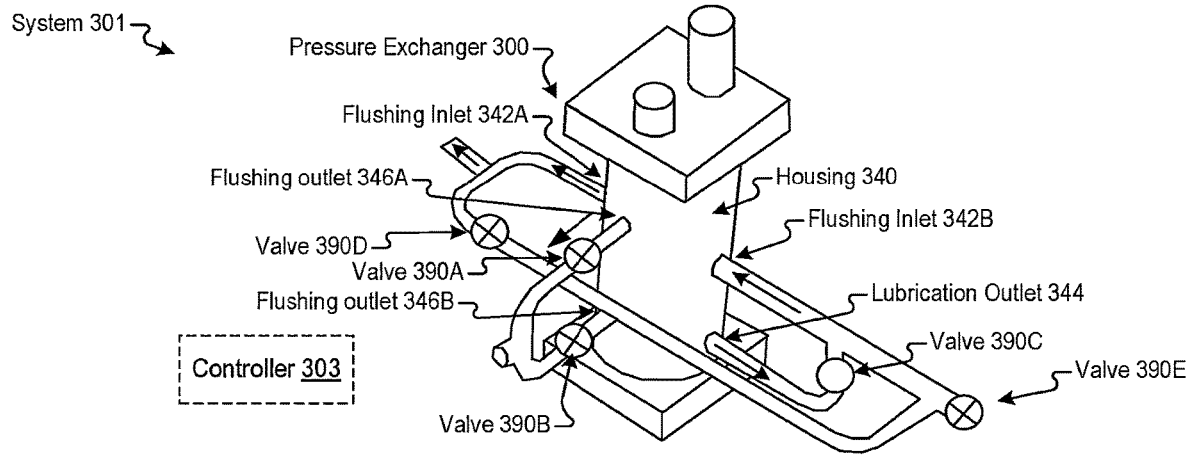
Figure 3M:
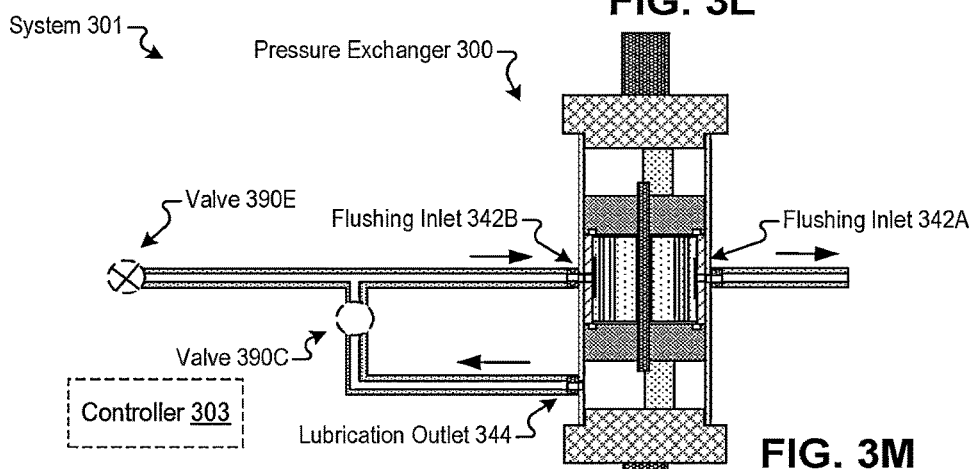
Figure 3N:
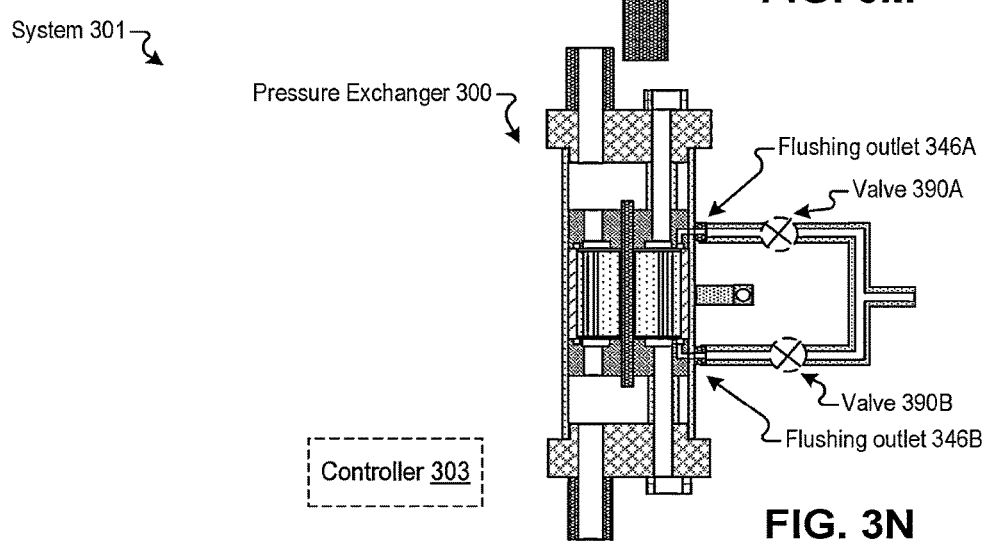
Figures 3O, 3P:
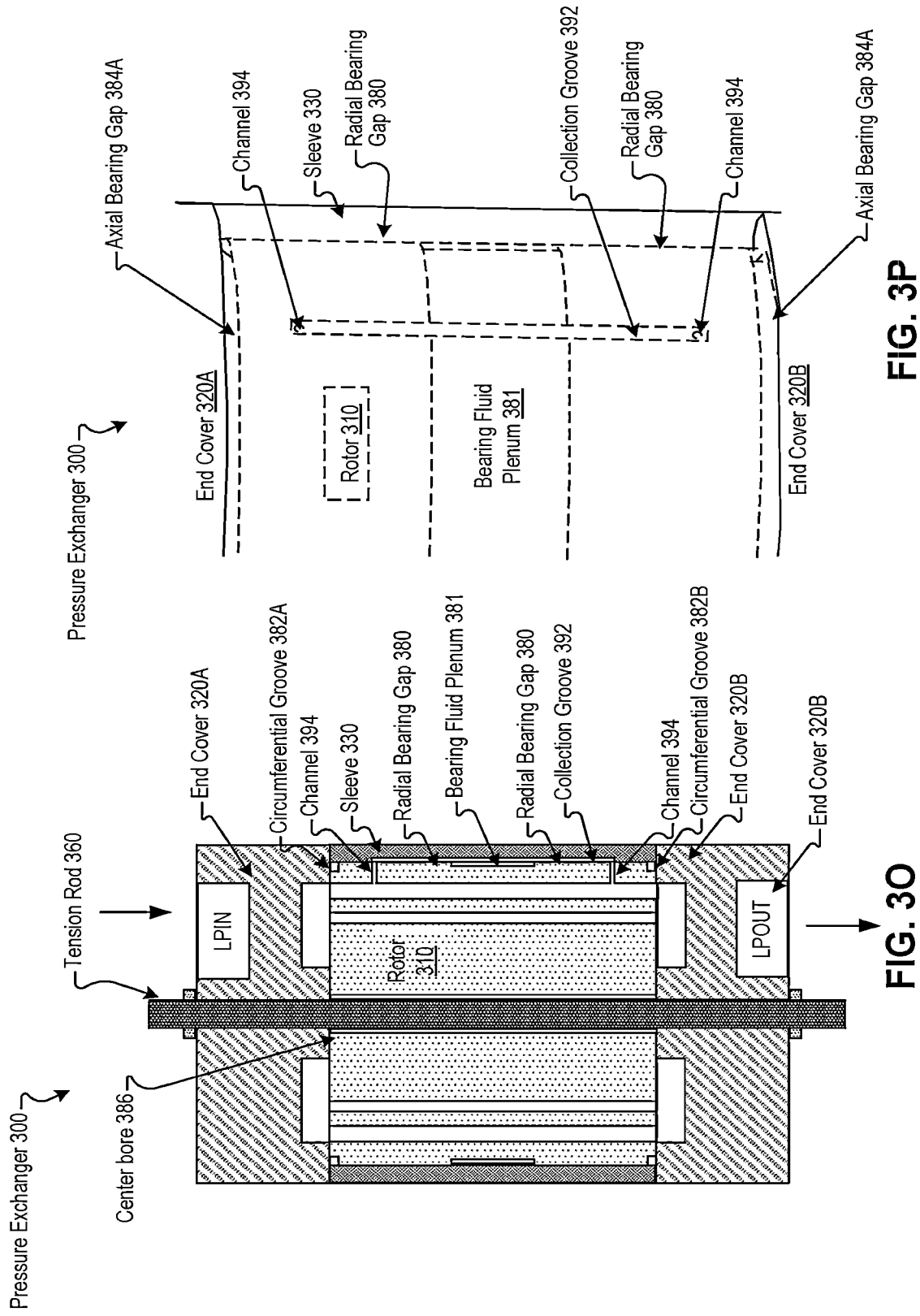
Figure 3U:
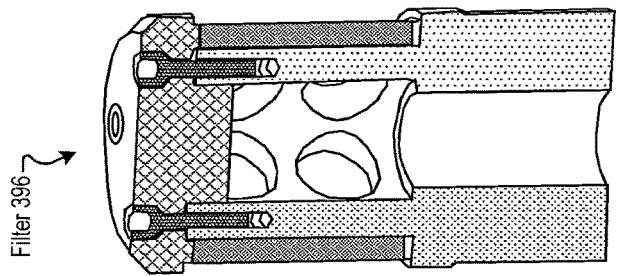
Figure 3V:
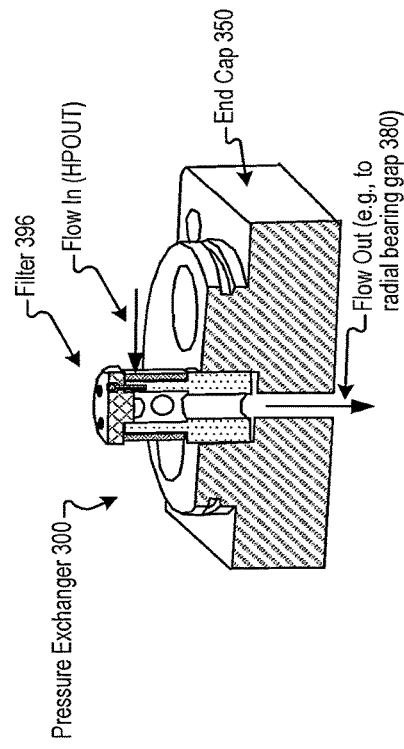

In some embodiments, PX 40 includes one or more of the features described in one or more of FIGS. 3A-V (e.g., inlets, outlets, and valves to perform flushing and lubrication operations) to provide fouling and particle handling capabilities.

PX 40 is configured to transfer pressure and/or work between a first fluid (e.g., proppant free fluid or supercritical carbon dioxide, HP fluid in 130) and a second fluid (e.g., frac fluid or superheated gaseous carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130), and after exchanging pressure, the outlet port 58 may be used to route a low-pressure first fluid (e.g., LP fluid out 140) out of the rotary PX 40. Similarly, the inlet port 60 may receive a low-pressure second fluid (e.g., LP fluid in 120) and the outlet port 62 may be used to route a high-pressure second fluid (e.g., HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

As noted above, one or more components of the PX 40, such as the rotor 46, the end cover 64, and/or the end cover 66, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, a controller using sensor feedback (e.g., revolutions per minute measured through a tachometer or optical encoder or volume flow rate measured through flowmeter) may control the extent of mixing between the first and second fluids in the rotary PX 40, which may be used to improve the operability of the fluid handling system (e.g., fluid handling systems 100A-D of FIGS. 1A-D). For example, varying the volume flow rates of the first and second fluids entering the rotary PX 40 allows the plant operator (e.g., system operator) to control the amount of fluid mixing within the PX 40. In addition, varying the rotational speed of the rotor 46 also allows the operator to control mixing. Three characteristics of the rotary PX 40 that affect mixing are: (1) the aspect ratio of the rotor channels 70; (2) the duration of exposure between the first and second fluids; and (3) the creation of a fluid barrier (e.g., an interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. For example, the speed of the rotor 46 (e.g., rotor speed of approximately 1200 RPM) may reduce contact times between the first and second fluids to less than approximately 0.15 seconds, 0.10 seconds, or 0.05 seconds. Third, a small portion of the rotor channel 70 is used for the exchange of pressure between the first and second fluids. Therefore, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers, either complete or partial, that isolate the first and second fluids while enabling pressure transfer.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from that shown in FIGS. 2A-2E. As described in detail below, the rotary PX 40 facilitates pressure exchange between first and second fluids by enabling the first and second fluids to briefly contact each other within the rotor 46. In certain embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and the rotational speed of rotor 46 dictate whether any mixing occurs and to what extent.

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. As will be discussed below, the rotor 46 may rotate in the clockwise direction indicated by arrow 84. In operation, low-pressure second fluid 86 passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 and the first fluid 88.

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

Abrasion and/or erosion damage in a PX may occur when suspended solids are introduced and mixed in the fluid that enters the PX. Abrasion damage may occur when particles enter gaps in the PX (e.g., trapped between a stationary end cover and a rotating rotor). Erosion damage may occur due to existence of suspended solids (e.g., erodents) in high velocity fluid jets (e.g., slurry jets) that are formed due to the high pressure differentials inside the PX. When the high velocity jet makes an impact with components of the PX, the high velocity jet can cause damage to those components. Damage (e.g., erosion damage) can occur when a high pressure rotor port (e.g., rotor duct) opens to a low pressure end cover port (e.g., kidney) or when a low pressure rotor port (e.g., rotor duct) opens to a high pressure end cover port (e.g., kidney) which causes a high pressure differential.

FIGS. 3A-V illustrate PXs 300, according to some embodiments. Hydraulic energy transfer system 110 of one or more of FIGS. 1A-D and/or PX 40 of one or more of FIGS. 2A-E may include one or more features, materials, functionalities, etc. that are the same as or similar to those of FIGS. 3A-V. PXs described in FIGS. 3A-V may include one or more features, materials, functionalities, etc. as described in relation to one or more of FIGS. 1A-2E.

PX 300 (e.g., rotary pressure exchanger) may have fouling and particle handling capabilities. PX 300 may be used for energy recovery in RO-based industrial waste water treatment plants. Conventional devices stall frequently due to fouling (e.g., scaling, organic growth) and particles getting embedded in gaps (e.g., narrow bearing gaps). The devices are then disassembled, bearing gaps are cleaned, and then the devices are reassembled which causes downtime. Disassembly and reassembly may damage components (e.g., brittle ceramics) which causes performance degradation and loss of function. Pre-treatment of industrial waste water to mitigate fouling and stalling is a challenge as water chemistry and composition varies from plant to plant and from industry to industry. To solve these and other problems, PX 300 (e.g., and system 301) of the present disclosure has the ability to manage foulants and particles without stalling.

System 301 may have a clean-in-place (CIP) system in the PX 300 which may allow for periodic flushing of the bearing gaps with fluid (e.g., cleaning agent, water, etc.). PX 300 may have features that prevent or delay fouling or accumulation of particles in bearing gaps. System 301 (e.g., clean-in-place system) may provide clean, high-pressure fluid to the portions of the PX 300 (e.g., to bearings, etc.) during operation of the PX 300 (e.g., exchanging of pressure between fluids) to prevent fouling and stalling. In some embodiments, a self-cleaning in-line bearing filter embedded in the PX 300 and can provide filtered fluid to the bearings (or other features of the PX 300).

FIG. 3A illustrates side cross-sectional view of a PX 300, according to certain embodiments. FIG. 3B illustrates front cross-sectional view of a PX 300, according to certain embodiments.

PX 300 includes a rotor 310, end covers 320A-B, sleeve 330, housing 340, end caps 350A-B, tension rod 360 (e.g., center post, shaft, etc.), and ports 370A-D. PX 300 may include flushing inlets 342A-B (e.g., see FIG. 3A), lubrication outlet 344 (e.g., see FIG. 3A), and/or flushing outlets 346A-B (e.g., see FIG. 3B).

Scale formation may occur in the radial bearing gaps 380 between rotor 310 and sleeve 330. Deposit or accumulation (e.g., any deposit or accumulation) in the radial bearing gaps 380 (e.g., due to micron level clearances) can cause the rotor 310 to slow down (e.g., enhancing mixing) or stall (e.g., loss of function of PX 300). Axial bearing gaps 384, circumferential grooves 382, outside diameter (OD) of sleeve 330, and center bore 386 are other locations where fouling can occur either due to small gaps or due to flow velocities being too small.

Flushing inlets 342A-B and flushing outlets 346A-B may be fluidly coupled to one or more features (e.g., gaps, grooves, radial bearing gaps 380, bearing fluid plenum 381, axial bearing gaps 384, circumferential grooves 382, OD of sleeve 330, center bore 386, etc.) of the PX 300.

In some embodiments, flushing inlets 342A-B are fluidly coupled to radial bearing gap 380 (e.g., via bearing fluid plenum 381) of PX 300 (e.g., a radial bearing gap 380 may be the two small gap end areas between rotor 310 and sleeve 330, bearing fluid plenum 381 may be a central area between rotor 310 and sleeve 330 where the rotor has a smaller diameter) and flushing outlets 346A-B are coupled to circumferential grooves 382 (e.g., circumferential grooves 382 may be formed by end covers 320 with the rotor 310 and/or sleeve 330 each overlapping a portion of the circumferential grooves 382). Lubrication outlet 344 may be coupled to a port 370 (e.g., port 370B, high pressure out (HPOUT) port).

The different operations may be controlled by actuating valves 390 of system 301. In some embodiments, system 301 may perform one or more operations more frequently (e.g., continuously, substantially continuously, internal lubrication operation during use of PX 300) and one or more operations less frequently (e.g., flushing operation when PX 300 is not operating. System 301 may perform the operations (e.g., flushing and/or lubrication operations) based on sensor data, based on duration of operation of PX 300, based on properties of the fluids entering and exiting the PX 300, and/or the like.

FIGS. 3C-E illustrate system 301 in an internal lubrication configuration, according to certain embodiments. System 301 (e.g., clean-in-place system) can be used to supply clean high pressure bearing fluid (e.g., internal lubrication operation) during operation of PX 300 (e.g., while PX 300 exchanges pressure between fluids). During operation of PX 300 (e.g., during normal operation), flushing line coming to the PX 300 (e.g., via valve 390E) and outlet valves 390A-B may be closed and HPOUT fluid may be taken from HPOUT plenum (e.g., from HPOUT port, from plenum between end cover 320B and port 370B) in the PX 300 (e.g., valve 390C may be in an open position) and fed through external piping to the radial bearing gap 380 (e.g., via bearing fluid plenum 381).

In some embodiments (e.g., during an internal lubrication operation during operation of PX 300), lubrication outlet 344 provides fluid flow (e.g., from HPOUT) to one or more flushing inlets 342 (e.g., flushing inlets 342A-B) which enters (e.g., lubricates) radial bearing gap 380 (e.g., via bearing fluid plenum 381), then flows to circumferential groove 382, then flows to axial bearing gaps 384A-B, and then exits via a port 370 (e.g., low pressure out (LPOUT) port).

FIGS. 3F-H illustrate system 301 in an external lubrication configuration, according to certain embodiments. System 301 (e.g., clean-in-place system) can be used to supply clean high pressure bearing fluid (e.g., internal lubrication operation) during operation of PX 300 (e.g., while PX 300 exchanges pressure between fluids). During operation of PX 300 (e.g., during normal operation), flushing outlet valves 390A-B may be closed, HPOUT bearing fluid supply can be shut off (e.g., valve 390C is in a closed position) and high pressure external clean bearing fluid can be piped in to keep PX 300 running for long times without fouling.

In some embodiments (e.g., during an external lubrication operation during operation of PX 300), external bearing fluid is provided to one or more flushing inlets 342 (e.g., flushing inlets 342A-B) which enters (e.g., lubricates) radial bearing gap 380 (e.g., via bearing fluid plenum 381), then flows to axial bearing gaps 384A-B, then flows to circumferential groove 382, and then exits via a port 370 (e.g., LPOUT port).

FIGS. 3I-K illustrate system 301 in a flushing configuration, according to certain embodiments. Operation of PX 300 is stopped (e.g., once a day) using valves on ports 370. Flushing system valves 390A-B are opened (e.g., and valve 390C is in a closed position) and high pressure flushing fluid (e.g., with appropriate chemicals such as scale dissolving agent, such as citric acid, at the right concentration) is fed (e.g., entering via flushing inlets 342) through the bearings (e.g., radial bearing gap 380 and/or axial bearing gaps 384) and out through the passages connected to the circumferential grooves 382 (e.g., exiting via flushing outlets 346A and 346B). Flushing pressure, flushing flow rate, flushing time, flushing fluid, and/or flushing interval are selected based on the particular application. In some embodiments, system 301 (e.g., flushing operation) can be used to soak the bearings (e.g., radial bearing gap 380, bearing fluid plenum 381, and/or axial bearing gaps 384) in scale dissolver or biocide (e.g., entering via flushing inlets 342) to remove fouling (e.g., without continuous flow).

In some embodiments (e.g., during a flushing operation, a clean-in-place operation, when PX 300 is not operating), external cleaning-in-place fluid (e.g., cleaning agent) is provided to one or more flushing inlets 342 (e.g., flushing inlets 342A-B) which enters (e.g., flushes) radial bearing gap 380, then flows to circumferential grooves 382, and then exits via flushing outlets 346A-B (e.g., that are fluidly coupled to circumferential grooves 382).

FIGS. 3L-N illustrate system 301 in a flushing configuration, according to certain embodiments. In some embodiments (e.g., during a flushing operation during operation of PX 300), lubrication outlet 344 provides fluid flow (e.g., from HPOUT) to one flushing inlet 342 (e.g., flushing inlet 342A) which enters (e.g., flushes) radial bearing gap 380 and exits via a different flushing inlet 342 (e.g., flushing inlet 342B) (e.g., to be drained via drainage line). Valve 390D (e.g., disposed between flushing inlet 324A and lubrication outlet 344) may be in a closed position to enable this operation. Valve 390C may be in an open position and valves 390A-B and valve 390E may be in a closed position.

FIGS. 3O-P illustrate PXs 300 that have a collection groove 392 (e.g., formed by sleeve 330), according to certain embodiments.

PX 300 may have one or more features (e.g., collection groove 392) configured to prevent or delay fouling and particle accumulation in the radial bearing gap 380 and circumferential grooves 382. In some embodiments, the circumferential grooves 382 are formed by the rotor 310 (e.g., circumferential grooves 382 are not made by the end covers 320). Circumferential grooves 382 in the rotor 310 may be less prone to fouling due to the rotation of rotor 310. A collection groove 392 (e.g., long substantially vertical slot) may be machined onto the inner surface of sleeve 330 (e.g., on low pressure side of PX 300). One or more channels 394 (e.g., thru-holes) may be machined from one of the ducts of rotor 310 to an outer surface of rotor 310. The channels 394 may connect with collection groove 392 when aligned with the low pressure kidneys of the end cover. Particles in the radial bearing gap 380 (e.g., and bearing fluid plenum 381) may be collected in the collection groove 392 and may be flushed away into LPOUT fluid flow through the channels 394 (e.g., duct holes). This may occur at least once per revolution (e.g., about once per revolution).

FIGS. 3Q-R illustrate PXs that have a collection groove 392 (e.g., formed by rotor 310), according to certain embodiments. Collection groove 392 may be machined onto the rotor. Sleeve 330 may have sleeve passages 393 that connect the collection groove 392 to the LPOUT fluid flow at least once per revolution (e.g., about once per revolution).

Figure 3T:
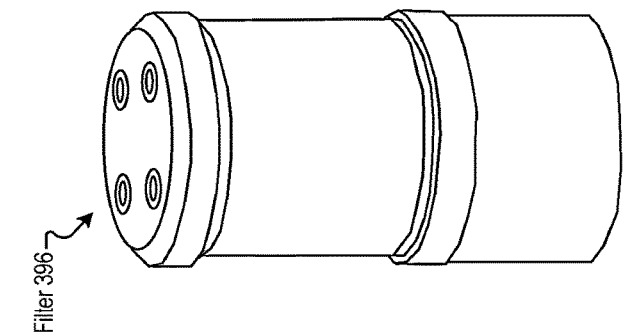
Figure 3S:
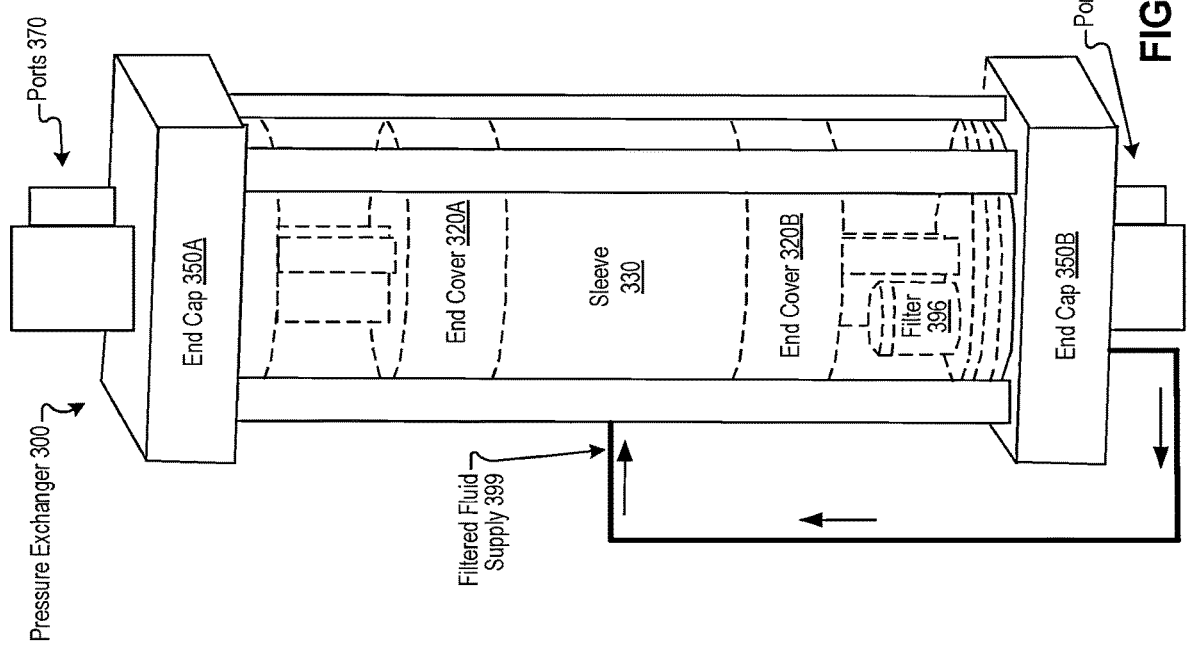

FIGS. 3S-V are associated with a filter 396 (e.g., self-cleaning in-line bearing fluid filter) of PX 300, according to certain embodiments. FIG. 3S illustrates a perspective view of a PX 300 including a filter 396. FIG. 3T illustrates a perspective view of a filter 396. FIG. 3U illustrates a cross-sectional view of a filter 396. FIG. 3V illustrates a filter 396 disposed in an end cap 350 of PX 300.

Referring to FIG. 3S, fluid flow exiting end cover 320B (e.g., HPOUT fluid flow) flows through filter 396 and then to filtered fluid supply 399 to one or more features of the PX 300 (e.g., one or more of bearing gap, radial bearing gap 380, axial bearing gap 384, circumferential groove 382, center bore 386, etc.). In some embodiments, a valve controls filtered fluid flow via filtered fluid supply 399. A controller 303 (e.g., see FIGS. 3C-3N) may actuate (e.g., periodically, based on sensor data, based on a schedule, etc.) the valve to an open position to provide the filtered fluid supply 399 to one or more features of the PX 300. In some embodiments, filter 396 filters HPOUT fluid flow to provide via the filtered fluid supply 399. In some embodiments, filter 396 filters HPIN fluid flow to provide via the filtered fluid supply 399.

In some embodiments, the filter 396 may prevent greater than about 10 micron suspended solid particles from reaching the bearing gaps (e.g., radial bearing gap 380, axial bearing gap 384, etc.). The filter 396 may be made of a porous metal or a hydrophobic porous plastic may be attached to the end cap 350 in the HPOUT plenum. The filter 396 may include a filter element housed in a metal cage that is threaded onto the end cap 350. HPOUT flow swirling in the plenum may clean the filter 396 and the filtered fluid may be collected (e.g., through a pipe, via a pathway formed by PX 300, via a pathway formed by sleeve 330 or housing 340) and fed to (e.g., directly to) the bearings (e.g., radial bearing gap 380, axial bearing gap 384, etc.). Filter 396 may be used with any of the embodiments of the present disclosure.

In some embodiments, system 301 is used in RO-based industrial waste water treatment. System 301 may allow use of PX 300 for energy recovery in RO-based industrial waste water treatment facilities. System 301 may allow use of PX when the process stream contains scale-causing ions, high chemical oxygen demand (COD) and/or biochemical oxygen demand (BOD) content, large concentrations of suspended particles, etc.

The present disclosure (e.g., one or more embodiments of FIGS. 3A-V) may have improvement in one or more of pressure range, efficiency, reduction in volume and cost, etc. compared to conventional solutions.

In some embodiments, one or more features of PX 300 includes a coating and/or surface treatment for biofouling and/or scaling resistance. The one or more features may include one or more of the circumferential groove 382 of end cover 320, center bore 386 of rotor 310, ducts of rotor 310, outer surface (e.g., outside diameter, lube hole) of sleeve 330, gap (e.g., radial bearing gap 380) between rotor 310 and sleeve 330, axial surface of rotor 310, and/or the like. One or more features of PX 300 may have reduced surface roughness, texturing to enhance hydrophobicity, altered surface chemical composition, surface charge, anti-adhesion coatings, oleophobic coatings, coatings with silver nano particles (e.g., silver nano particle coating), and/or the like.

FIGS. 4A-D are flow diagrams illustrating methods 400A-D associated with pressure exchanger systems (e.g., system 301 and/or PX 300 of one or more of FIGS. 3A-V), according to certain embodiments. In some embodiments, methods 400A-D are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 400A-D are performed, at least in part, by a controller (e.g., of control module 180 or controllers 185 of FIGS. 1A-D, control module 94 of FIGS. 2A-E, controller 303 of FIGS. 3C-3N). In some embodiments, a non-transitory storage medium stores instructions that when executed by a processing device (e.g., of control module 180 or controllers 185 of FIGS. 1A-D, control module 94 of FIGS. 2A-E, controller 303 of FIGS. 3C-3N), cause the processing device to perform one or more of methods 400A-D.

For simplicity of explanation, methods 400A-D are depicted and described as a series of operations. However, operations in accordance with this disclosure can occur in various orders and/or concurrently and with other operations not presented and described herein. Furthermore, in some embodiments, not all illustrated operations are performed to implement methods 400A-D in accordance with the disclosed subject matter. In addition, those skilled in the art will understand and appreciate that methods 400A-D could alternatively be represented as a series of interrelated states via a state diagram or events.

Figure 4A:
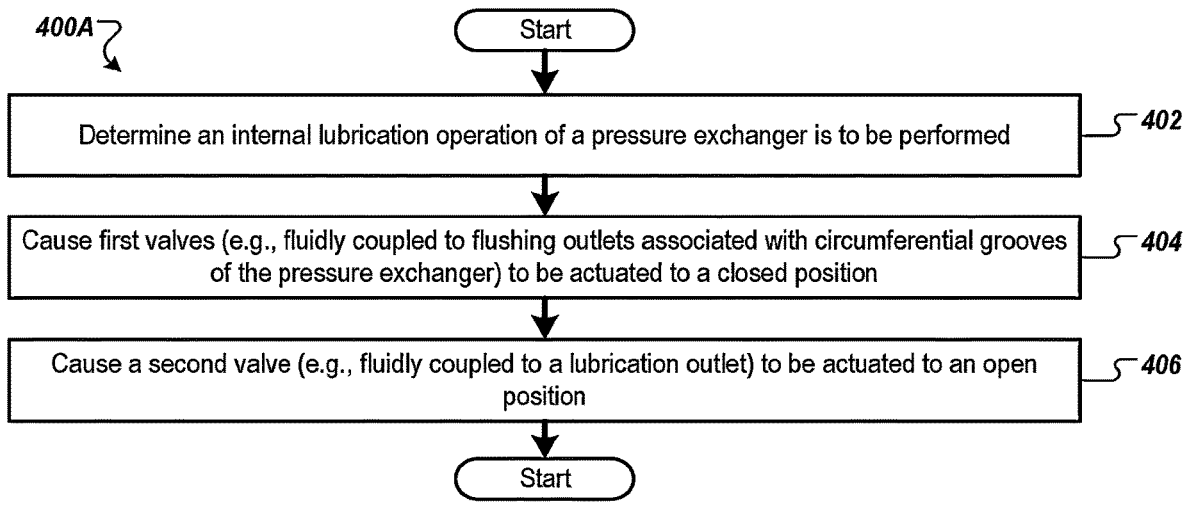
FIGS. 4A-D are flow diagram illustrating methods associated with pressure exchanger systems, according to some embodiments.

Referring to FIG. 4A, at block 402, processing logic (e.g., controller) determines (e.g., via user input) an internal lubrication operation of a pressure exchanger is to be performed.

At block 404, processing logic causes one or more first valves (e.g., fluidly coupled to one or more flushing outlets associated with circumferential grooves of the pressure exchanger) to be actuated to a closed position.

At block 406, processing logic causes a second valve (e.g., fluidly coupled to a lubrication outlet, located between lubrication outlet and one or more flushing inlets) to be actuated to an open position.

The lubrication outlet may provide fluid flow (e.g., from HPOUT, from lubrication outlet) to one or more flushing inlets which enters (e.g., lubricates) radial bearing gap (e.g., via bearing fluid plenum), then flows to circumferential groove, then flows to axial bearing gaps, and then exits via a port of the pressure exchanger (e.g., low pressure out (LPOUT) port).

Figure 4B:
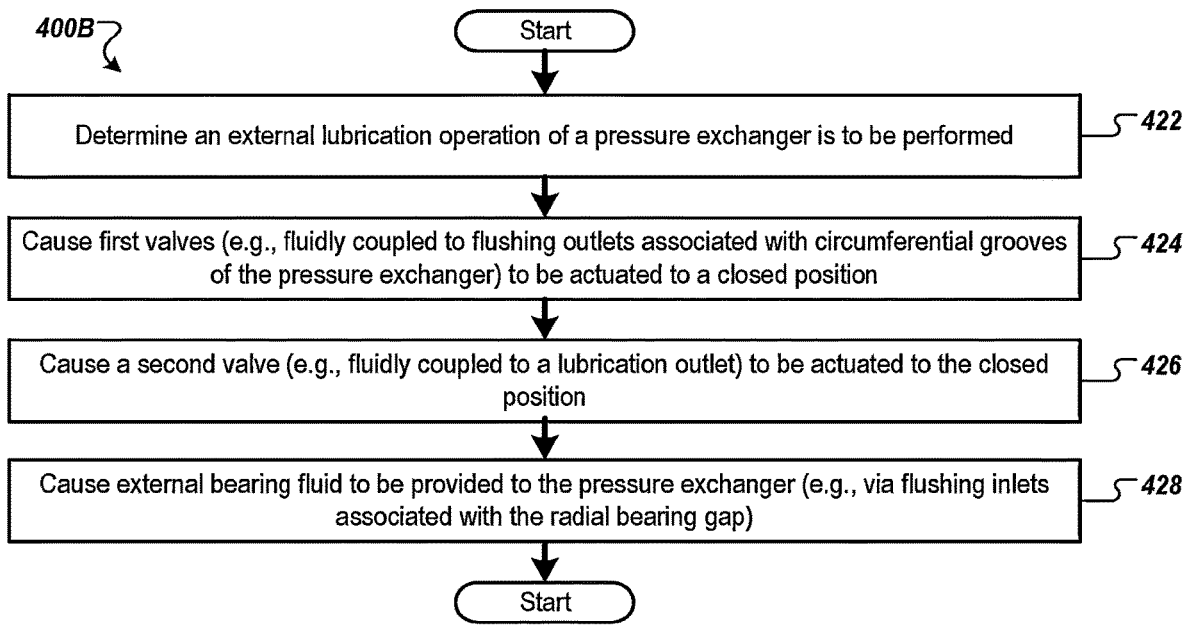

Referring to FIG. 4B, at block 422, processing logic (e.g., controller) determines an external lubrication operation of a pressure exchanger is to be performed.

At block 424, processing logic causes first valves (e.g., fluidly coupled to flushing outlets associated with circumferential grooves of the pressure exchanger) to be actuated to a closed position.

At block 426, processing logic causes a second valve (e.g., fluidly coupled to a lubrication outlet, located between lubrication outlet and flushing inlets) to be actuated to the closed position.

At block 428, processing logic causes external bearing fluid to be provided to the pressure exchanger (e.g., via flushing inlets associated with the radial bearing gap). The external bearing fluid may be provided to one or more flushing inlets which enters (e.g., lubricates) radial bearing gap (e.g., via bearing fluid plenum), then flows to circumferential groove, then flows to axial bearing gaps, and then exits via a port of the pressure exchanger (e.g., LPOUT port). Method 400B of FIG. 4B may be used when the process fluid (e.g., fluid exchanging pressure with another fluid in the pressure exchanger) is not suitable as a bearing fluid (e.g., the process fluid causes fouling and frequent stalls or slowdown of the rotor), the HPOUT bearing fluid supply can be shut off and high pressure external clean bearing fluid can be piped in to keep PX running for long times without fouling.

Figure 4C:
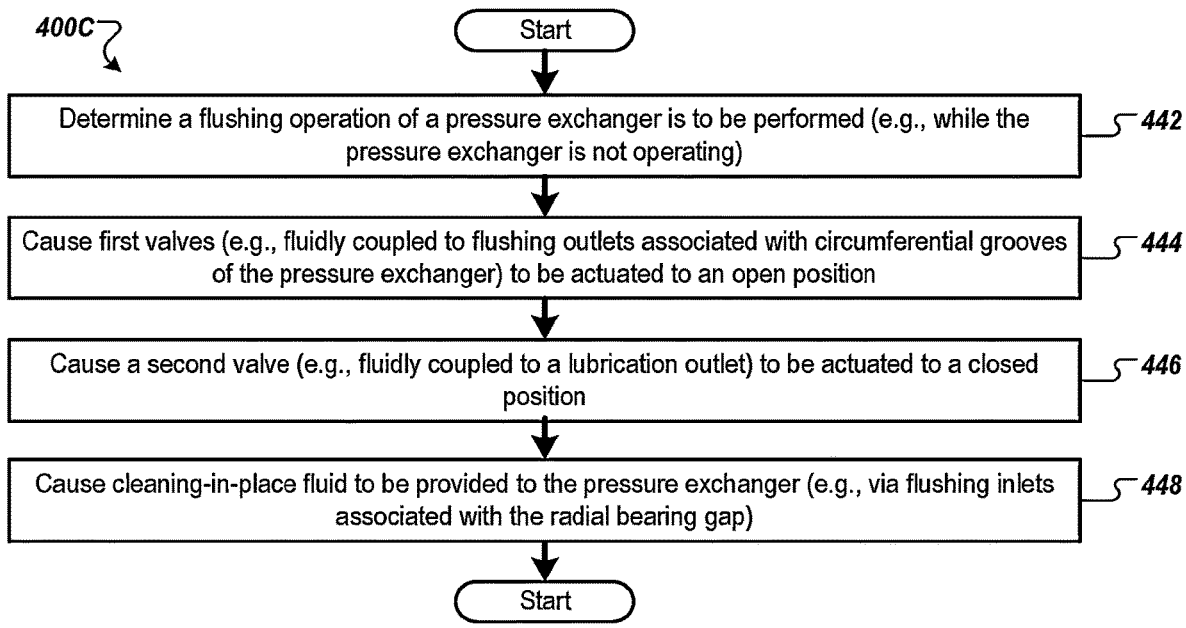

Referring to FIG. 4C, at block 442, processing logic (e.g., controller) determines a flushing operation of a pressure exchanger is to be performed (e.g., while the pressure exchanger is not operating).

At block 444, processing logic causes first valves (e.g., fluidly coupled to flushing outlets associated with circumferential grooves of the pressure exchanger) to be actuated to an open position.

At block 446, processing logic causes a second valve (e.g., fluidly coupled to a lubrication outlet) to be actuated to a closed position.

At block 448, processing logic causes cleaning-in-place fluid to be provided to the pressure exchanger (e.g., via flushing inlets associated with the radial bearing gap). In method 400C of FIG. 4C, cleaning-in-place fluid (e.g., cleaning agent) may be provided to one or more flushing inlets which enters (e.g., flushes) radial bearing gap (e.g., via bearing fluid plenum), then flows to circumferential groove, and then exits via flushing outlets.

Figure 4D:
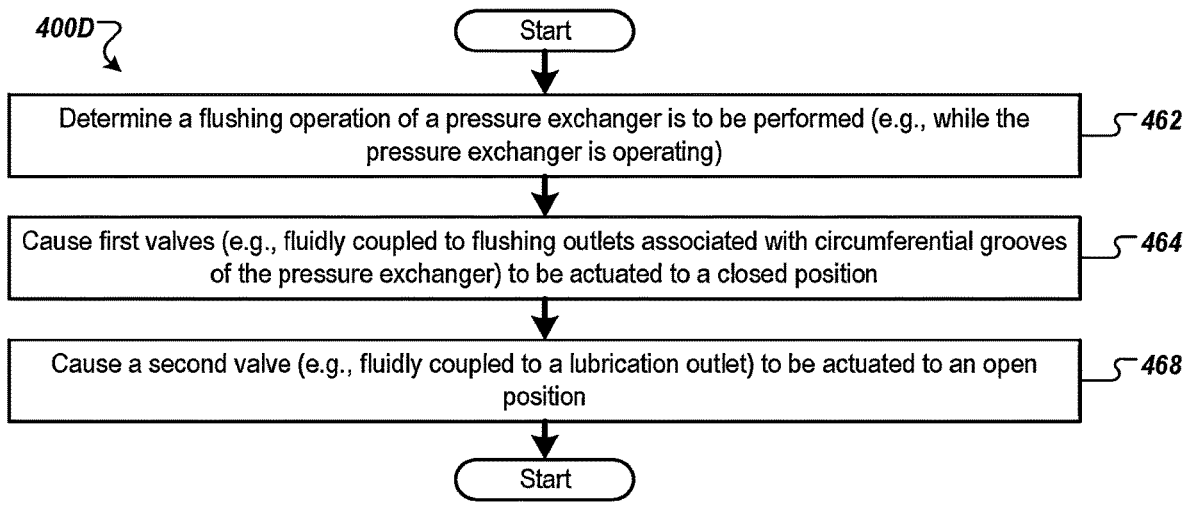

Referring to FIG. 4D, at block 462, processing logic (e.g., controller) determines a flushing operation of a pressure exchanger is to be performed (e.g., while the pressure exchanger is operating).

At block 464, processing logic causes first valves (e.g., fluidly coupled to flushing outlets associated with circumferential grooves of the pressure exchanger) to be actuated to a closed position.

At block 466, processing logic causes a second valve (e.g., fluidly coupled to a lubrication outlet) to be actuated to an open position. In method 400D of FIG. 4D, lubrication outlet may provide fluid flow (e.g., from HPOUT) to a first flushing inlet which enters radial bearing gap and exits via a second flushing inlet (e.g., a valve disposed between second flushing inlet and lubrication outlet is in a closed position).

Figure 5:
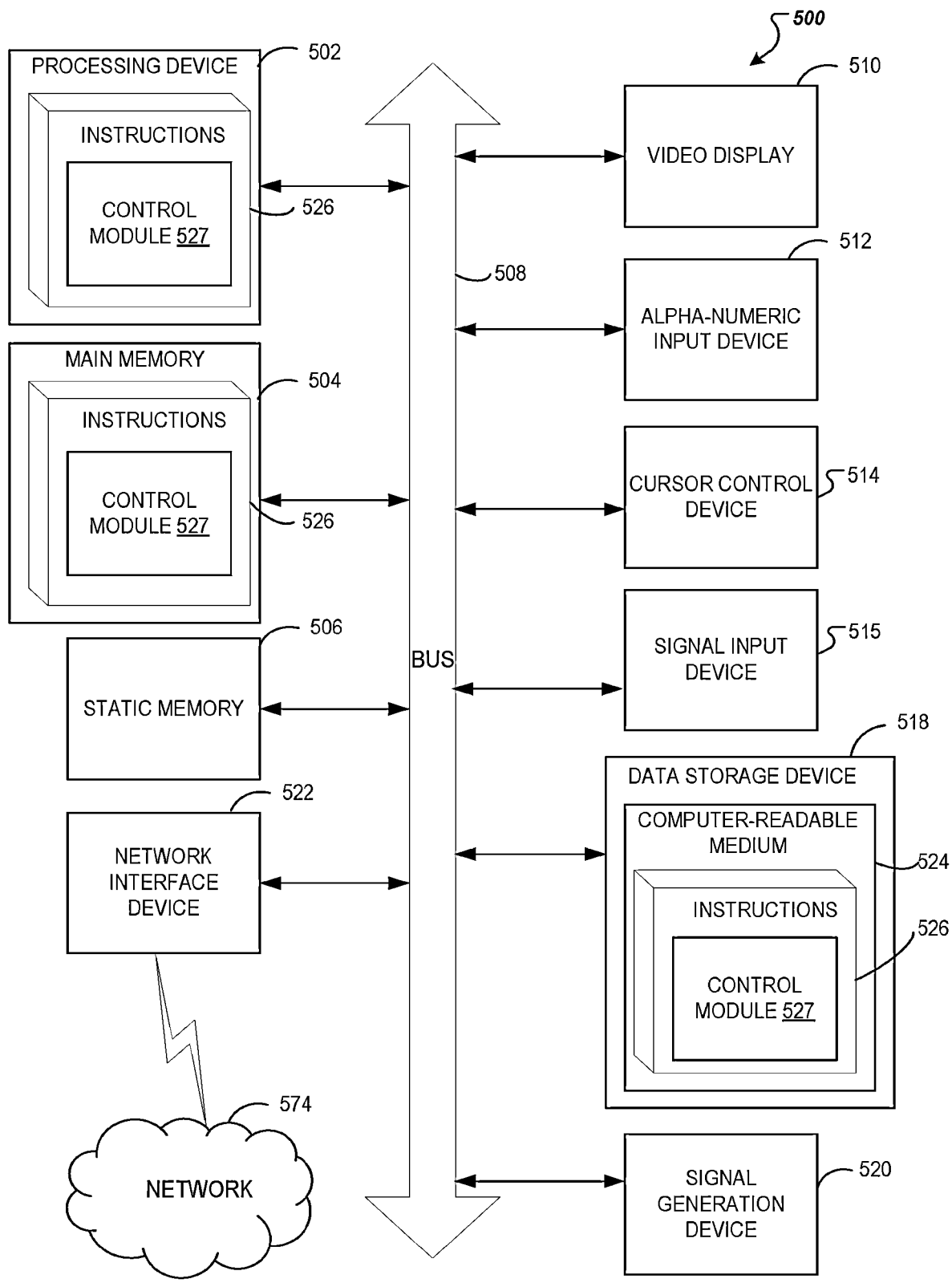
FIG. 5 is a block diagram illustrating a computer system, according to certain embodiments.

FIG. 5 is a block diagram illustrating a computer system 500, according to some embodiments. In some embodiments, the computer system 500 is a controller, controller device, client device, server, control module 180 or controllers 185 of FIGS. 1A-D, control module 94 of FIGS. 2A-E, controller 303 of FIGS. 3C-N, etc.

In some embodiments, computer system 500 is connected (e.g., via a network, such as a Local Area Network (LAN), an intranet, an extranet, or the Internet) to other computer systems. Computer system 500 operates in the capacity of a server or a client computer in a client-server environment, or as a peer computer in a peer-to-peer or distributed network environment. In some embodiments, computer system 500 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 500 includes a processing device 502, a volatile memory 504 (e.g., Random Access Memory (RAM)), a non-volatile memory 506 (e.g., Read-Only Memory (ROM) or Electrically-Erasable Programmable ROM (EEPROM)), and/or a data storage device 516, which communicates with each other via a bus 508.

In some embodiments, processing device 502 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), a PID controller, or a network processor). In some embodiments, processing device 502 is provided by one or more of a single processor, multiple processors, a single processor having multiple processing cores, and/or the like.

In some embodiments, computer system 500 further includes a network interface device 522 (e.g., coupled to network 574). In some embodiments, the computer system 500 includes one or more input/output (I/O) devices. In some embodiments, computer system 500 also includes a video display unit 510 (e.g., a liquid crystal display (LCD)), an alphanumeric input device 512 (e.g., a keyboard), a cursor control device 514 (e.g., a mouse), and/or a signal generation device 520. Computer system 500 may include signal input device 515, e.g., for receiving signals from other devices. For example, signal input device 515 may facilitate reception by computer system 500 of measurement data from sensors associated with a fluid handling system. Signal generate device 520 may be utilized to generate and/or send control signals for sending instructions to one or more components of a fluid handling system.

In some implementations, data storage device 518 (e.g., disk drive storage, fixed and/or removable storage devices, fixed disk drive, removable memory card, optical storage, network attached storage (NAS), and/or storage area-network (SAN)) includes a non-transitory computer-readable storage medium 524 on which stores instructions 526 encoding any one or more of the methods or functions described herein, and for implementing methods described herein. Control module 527 (e.g., including any of controllers and/or control modules of the present disclosure) may be included in instructions 526.

In some embodiments, instructions 526 also reside, completely or partially, within volatile memory 504 and/or within processing device 502 during execution thereof by computer system 500, hence, volatile memory 504 and processing device 502 also constitute machine-readable storage media, in some embodiments.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs, or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise or clear from context, terms such as "receiving," "transmitting," "determining," "generating," "causing," "actuating," "adjusting," "controlling," "identifying," "providing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

The preceding description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. Descriptions of systems herein may include descriptions of one or more optional components. Components may be included in combinations not specifically discussed in this disclosure, and still be within the scope of this disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within ±10%. Also, the terms "first," "second," "third," "fourth," etc. as used herein are meant as labels to distinguish among different elements and can not necessarily have an ordinal meaning according to their numerical designation.

The terms "over," "under," "between," "disposed on," "before," "after," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers or components.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A system comprising:
a pressure exchanger comprising:
a rotor configured to exchange pressure between a first fluid and a second fluid;
a housing disposed around the rotor;
one or more flushing inlets coupled to the housing; and
one or more flushing outlets coupled to the housing; and
one or more first valves coupled to the one or more flushing outlets, wherein the one or more first valves in an open position are associated with a flushing operation, and wherein the one or more first valves in a closed position are associated with a lubrication operation.

2. The system of claim 1 further comprising a lubrication outlet and a second valve coupled to the lubrication outlet, the second valve having an open position and a closed position, wherein:
the one or more first valves in the closed position and the second valve in the closed position are associated with the lubrication operation being an external lubrication operation;
the one or more first valves in the closed position and the second valve in the open position are associated with the lubrication operation being an internal lubrication operation; and
the one or more first valves in the open position and the second valve in the closed position are associated with the flushing operation.

3. The system of claim 2, wherein the lubrication outlet is fluidly coupled to a high pressure outlet port of the pressure exchanger.

4. The system of claim 2 further comprising a third valve having an open position and a closed position, the third valve being associated with at least one of the one or more flushing inlets, wherein:
the one or more first valves in the closed position, the second valve in the open position, and the third valve in the closed position are associated with lubrication fluid entering through a first flushing inlet of the one or more flushing inlets and exiting through a second flushing inlet of the one or more flushing inlets to a drainage line.

5. The system of claim 1, wherein the one or more flushing inlets are fluidly coupled with a radial bearing gap between the rotor and a sleeve disposed around the rotor.

6. The system of claim 1, wherein the one or more flushing outlets are fluidly coupled with circumferential grooves between the rotor and end covers disposed at distal ends of the rotor.

7. The system of claim 1, wherein at least one of the one or more flushing inlets or the one or more flushing outlets are associated with flushing one or more of:
a radial bearing gap between the rotor and a sleeve of the pressure exchanger;
circumferential grooves between the rotor and end covers disposed at distal ends of the rotor;
an axial bearing gap disposed between the rotor and the end covers;
a sleeve outside diameter disposed between the sleeve and the housing; or
a tension rod disposed in the rotor.

8. The system of claim 1, wherein:
an inner surface of a sleeve of the pressure exchanger forms a collection groove;
the sleeve is disposed around the rotor;
the rotor forms a channel between a duct and an outside surface of the rotor; and
particles are to be collected in the collection groove and flushed out through the duct responsive to the channel aligning with the collection groove.

9. The system of claim 1, wherein:
a sleeve is disposed around the rotor;
an outer surface of the rotor forms a collection groove; and
the sleeve forms a passage that connects the collection groove with an outlet of the pressure exchanger responsive to the collection groove aligning with the passage.

10. The system of claim 1 further comprising an end cap disposed at a distal end of the pressure exchanger and a bearing fluid filter disposed in the end cap, wherein the pressure exchanger is to direct a portion of the first fluid or the second fluid exiting the pressure exchanger through the bearing fluid filter to bearings of the pressure exchanger.

11. The system of claim 1 further comprising a coating on one or more of:
an end-cover circumferential groove;
a rotor center bore;
a rotor duct;
a sleeve outer surface;
a rotor outer surface; or
a rotor axial surface.

12. The system of claim 11, wherein the coating is one or more of a hydrophobic coating, anti-adhesion coating, oleophobic coating, or silver nano particle coating.

13. A pressure exchanger comprising:
a rotor configured to exchange pressure between a first fluid and a second fluid;
a housing disposed around the rotor;
one or more flushing inlets coupled to the housing and associated with a radial bearing gap of the pressure exchanger; and
flushing outlets coupled to the housing and associated with circumferential grooves of the pressure exchanger, wherein one or more first valves are coupled to the flushing outlets, wherein the one or more first valves in an open position are associated with a flushing operation, and wherein the one or more first valves in a closed position are associated with a lubrication operation.

14. The pressure exchanger of claim 13 further comprising a lubrication outlet and a second valve coupled to the lubrication outlet, the second valve having an open position and a closed position, wherein:
the one or more first valves and the second valve in the closed position are associated with an external lubrication operation;
the one or more first valves in the closed position and the second valve in the open position are associated with an internal lubrication operation; and the one or more first valves in the open position and the second valve in the closed position are associated with the flushing operation.

15. The pressure exchanger of claim 13, wherein:
a sleeve of the pressure exchanger is disposed around the rotor;
an inner surface of the sleeve forms a collection groove;
the rotor forms a channel between a duct and an outside surface of the rotor; and
particles are to be collected in the collection groove and flushed out through the duct responsive to the channel aligning with the collection groove.

16. The pressure exchanger of claim 13, wherein:
a sleeve of the pressure exchanger is disposed around the rotor;
an outer surface of the rotor forms a collection groove; and
the sleeve forms a passage that connects the collection groove with a low pressure outlet of the pressure exchanger responsive to the collection groove aligning with the passage.

17. The pressure exchanger of claim 13 further comprising an end cap disposed at a distal end of the pressure exchanger and a bearing fluid filter disposed in the end cap, wherein the pressure exchanger is to direct a portion of fluid exiting the pressure exchanger through the bearing fluid filter to bearings of the pressure exchanger.

18. A method comprising:
causing one or more first valves to be actuated to an open position, the one or more first valves being coupled to flushing outlets of a pressure exchanger, wherein the flushing outlets are coupled to a housing of the pressure exchanger and are associated with circumferential grooves of the pressure exchanger; and
causing a second valve to be actuated to a closed position, the second valve being associated with a lubrication outlet, wherein the one or more first valves in the open position and the second valve in the closed position are associated with a flushing operation of the pressure exchanger.

19. The method of claim 18 further comprising causing a cleaning-in-place fluid to flow via one or more flushing inlets coupled to the housing and associated with a radial bearing gap of the pressure exchanger to cause fluid flow through the radial bearing gap to the circumferential grooves and out via the flushing outlets.

20. The method of claim 18 further comprising causing the one or more first valves to be actuated to a closed position and the second valve to be actuated to an open position to perform an internal lubrication operation of the pressure exchanger.

* * * * *